United States Patent
Biagetti et al.

(10) Patent No.: US 12,527,797 B2
(45) Date of Patent: Jan. 20, 2026

(54) ISOCHROMENE DERIVATIVES AS PHOSPHOINOSITIDE 3-KINASES INHIBITORS

(71) Applicant: CHIESI FARMACEUTICI S.P.A., Parma (IT)

(72) Inventors: Matteo Biagetti, Parma (IT); Paolo Ronchi, Parma (IT); Claudio Fiorelli, Parma (IT); Paolo Bruno, Parma (IT)

(73) Assignee: CHIESI FARMACEUTICI S.p.A., Parma (IT)

( * ) Notice: Subject to any disclaimer, the term of this patent is extended or adjusted under 35 U.S.C. 154(b) by 962 days.

(21) Appl. No.: 17/600,676

(22) PCT Filed: Mar. 24, 2020

(86) PCT No.: PCT/EP2020/058168
§ 371 (c)(1),
(2) Date: Oct. 1, 2021

(87) PCT Pub. No.: WO2020/200918
PCT Pub. Date: Oct. 8, 2020

(65) Prior Publication Data
US 2022/0175784 A1 Jun. 9, 2022

(30) Foreign Application Priority Data
Apr. 4, 2019 (EP) ..................... 19167245

(51) Int. Cl.
*A61K 31/519* (2006.01)
*A61K 9/00* (2006.01)
*C07D 487/04* (2006.01)

(52) U.S. Cl.
CPC .......... *A61K 31/519* (2013.01); *A61K 9/0075* (2013.01); *C07D 487/04* (2013.01)

(58) Field of Classification Search
None
See application file for complete search history.

(56) References Cited

U.S. PATENT DOCUMENTS

| | | | |
|---|---|---|---|
| 9,321,776 B2 * | 4/2016 | Biagetti | A61P 25/00 |
| 2015/0166549 A1 * | 6/2015 | Biagetti | A61P 11/08 |
| | | | 544/122 |

FOREIGN PATENT DOCUMENTS

| | | |
|---|---|---|
| EA | 27123 B1 | 6/2017 |
| EA | 24842 B9 | 9/2017 |
| JP | 2017501146 A | 1/2017 |
| JP | 2017518326 A | 7/2017 |
| RU | 2722383 C2 | 5/2020 |
| WO | WO-2015091685 A1 | 6/2015 |
| WO | WO-2016166239 A1 | 10/2016 |

OTHER PUBLICATIONS

Patani, G.A., et al., Bioisosterism: A rational approach in drug design, 1996, Chemical Reviews, vol. 96, 3147-3176 (Year: 1996).*
Extended European Search Report issued Sep. 19, 2019 in Patent Application No. 19167245.0, 8 pages.
International Search Report and Written Opinion issued May 12, 2020 in PCT/EP2020/058168, 14 pages.
Timothy D. Cushing et al: "PI3K[delta] and PI3K [gamma] as Targets for Autoimmune and Inflammatory Diseases", Journal of Medicinal Chemistry, vol. 55, No. 20, XP055110817, Oct. 25, 2012, pp. 8559-8581.
Office Action issued Mar. 12, 2024 in corresponding Japanese Patent Application No. 2021-558911 (with Office Action Summary and English translation), 9 pages.
Office Action and Search Report issued Jul. 12, 2023 in Eurasian Patent Application No. 2021132112 (with English translation), 31 pages.

* cited by examiner

*Primary Examiner* — Bethany P Barham
*Assistant Examiner* — Paul Hoerner
(74) *Attorney, Agent, or Firm* — Element IP, PLC

(57) ABSTRACT

The invention relates to compounds of formula (I) inhibiting phosphoinositide 3-kinases (PI3K), to pharmaceutical compositions comprising them and therapeutic use thereof in the treatment of disorders associated with PI3K enzymes.

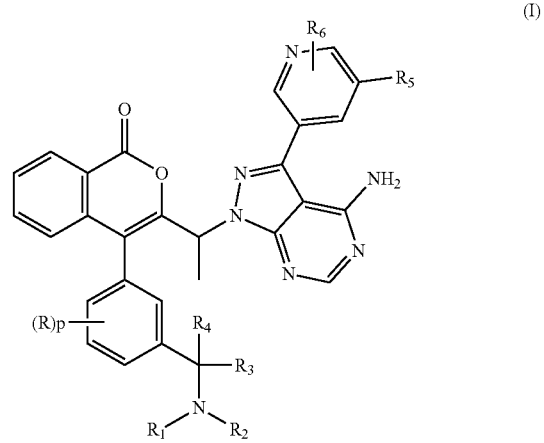

16 Claims, No Drawings

ISOCHROMENE DERIVATIVES AS PHOSPHOINOSITIDE 3-KINASES INHIBITORS

CROSS-REFERENCE TO RELATED APPLICATIONS

This application is a national stage entry of international application no. PCT/EP2020/058168, filed on Mar. 24, 2020, and claims priority to European application no. 19167245.0, filed on Apr. 4, 2019, the contents of both of which are incorporated by reference.

FIELD OF THE INVENTION

The present invention relates to compounds inhibiting Phosphoinositide 3-kinases (hereinafter PI3K); particularly the invention relates to compounds that are isochromene derivatives, methods of preparing such compounds, pharmaceutical compositions containing them and therapeutic use thereof.

More particularly, the compounds of the invention are inhibitors of the activity or function of the Class I of PI3K and more specifically, they are inhibitors of the activity or function of PI3Kα, PI3Kβ, PI3Kδ and/or PI3Kγ isoforms of the Class I PI3K.

Therefore, the compounds of the invention may be useful in the treatment of many disorders associated with PI3K enzymes mechanisms, such as respiratory diseases including asthma, chronic obstructive pulmonary disease (COPD) and cough.

BACKGROUND OF THE INVENTION

In biochemistry, a kinase is a type of enzyme that transfers phosphate groups from high-energy donor molecules, such as ATP, to specific substrates, a process referred to as phosphorylation. Specifically, PI3K enzymes are lipid enzyme kinases that can phosphorylate Phosphoinositides (PIs) at the 3'-hydroxyl group of the inositol ring (Panayotou et al, Trends Cell Biol 2:358-60 (1992)). It is well known that PIs, localised in the plasma membranes, can act as second messengers in signaling cascades by docking proteins containing pleckstrin-homology (PH), FYVE, PX and other phospholipid-binding domains (Vanhaesebroeck B et al, Annu. Rev. Biochem 70, 535-602, 2001; Katso R et al, Annu. Rev. Cell Dev. Biol. 17, 615-675, 2001).

Therefore, PIs can act as second messengers in many cellular processes including signal transduction, regulation of membrane trafficking and transport, cytoskeleton organization, cell survival and death, and many other functions.

PIs may be bound to the lipid bilayer of the cell membrane via two fatty acids that are attached to the cytosolic inositol ring via a glycerol phosphate linker. PIs inositol ring can be phosphorylated by PI3K enzymes, leading to the regulation of cellular growth, survival and proliferation. For this reason, PIs phosphorylation by PI3K enzymes is one of the most relevant signal transduction events associated with mammalian cell surface receptor activation (Cantley L C, Science 296, 1655-7, 2002; Vanhaesebroeck B et al, Annu. Rev. Biochem 70, 535-602, 2001).

The PI3K enzymes have been divided into three classes: Class I PI3K, Class II PI3K and Class III PI3K, on the basis of sequence homology, structure, binding partners, mode of activation, and substrate preference (Vanhaesebroeck B et al, Exp. Cell Res. 253(1), 239-54, 1999; and Leslie N R et al, Chem. Rev. 101(8), 2365-80, 2001).

Class I PI3K convert phosphoinositide-(4,5)-diphosphate (PI(4,5)P2) to phosphoinositide-(3,4,5)-triphosphate (PI(3,4,5)P3), which functions as a second messenger. The signaling cascade activated by the increase in intracellular levels of PI(3,4,5)P3 is negatively regulated through the action of 5'-specific and 3'-specific phosphatases (Vanhaesebroeck B et al., Trends Biochem. Sci. 22(7), 267-72, 1997; Katso R et al, Annu. Rev. Cell Dev. Biol. 17, 615-75, 2001; and Toker A, Cell. Mol. Life Sci. 59(5), 761-79, 2002).

Class II PI3K enzymes are the most recently identified class of PI3K and their exact function is still unclear.

Class III PI3K enzymes consists of a single family member which is structurally related to Class I PI3K enzymes and appears to be important in endocytosis and vesicular trafficking. However, there are some evidences showing that Class III PI3K may be relevant in immune cell processes, such as phagocytosis and Toll-like receptor (TLR) signalling.

Class I PI3K enzymes can be further divided in class IA and class IB on the basis of their activation mechanisms.

In more detail, Class IA PI3K enzymes comprises three closely related isoforms: PI3Kα, PI3Kβ and PI3Kδ, while Class IB comprises only the PI3Kγ isoform. These enzymes are heterodimers composed of a catalytic subunit known as p110, with four types: alpha (α), beta (β), delta (δ) and gamma (γ) isoforms, constitutively associated with a regulatory subunit. The first two p110 isoforms (α and β) are ubiquitously expressed and involved in cellular differentiation and proliferation. Consequently, PI3Kα and PI3Kβ enzymes have been extensively studied as targets for the development of new chemotherapeutic agents.

Otherwise, p110δ and p110γ isoforms are mainly expressed in leukocytes and are important in the activation of the immune response, such as leukocytes migration, B and T cells activation and mast cells degranulation. Therefore, PI3Kδ and PI3Kγ isoforms are very relevant in inflammatory respiratory diseases.

Presently, the inhibitors derivatives of PI3K enzymes known in the art could generally inhibit said isoforms (alpha α, beta β, delta δ and gamma γ isoforms) and they could act on the individual roles played in various diseases by said specific isoforms.

Therefore, specific activity assays of Class IA inhibitors for one specific PI3Kα, PI3Kβ, PI3Kδ and PI3Kγ isoform over another have been extensively developed in order to discern the suitable profile for the treatment of disorders associated with PI3K enzymes mechanisms. Such disorders could, for example, include respiratory diseases selected from idiopathic chronic cough, cough-variant asthma, cough associated with thoracic tumour or lung cancer, viral or post-viral cough, upper airways cough syndrome (UACS) or post nasal drip cough, or cough associated with gastro-oesophageal reflux disease both acid and non acid, asthma, chronic bronchitis, chronic obstructive pulmonary disease (COPD), interstitial lung disease, idiopathic pulmonary fibrosis (IPF).

In view of the number of pathological responses which are mediated by PI3K enzymes, there is a continuing need for inhibitors of PI3K enzymes which can be useful in the treatment of many disorders and particularly respiratory diseases. Thus, the present invention relates to novel compounds which are inhibitors of PI3Kα, PI3Kβ, PI3Kδ and PI3Kγ isoforms of Class I PI3K enzymes that, for the above reasons, may often have therapeutically desirable characteristics.

With reference to the treatment of respiratory diseases there are some compounds known in the prior art to be active as PI3K inhibitors. For example WO 2015/193263; WO 2016/038140; WO 2016/166239 and WO 2017/134053 disclose Indolizine, Pyridazinone, Chromene and Pyrazole derivatives as phosphoinositide 3-kinases inhibitors. WO 2015/091685 is a copending application of the same Applicant disclosing isocumarine and isochromene compounds derivatives.

Even if the prior art compounds exhibit activity in inhibiting the PI3K, the compounds of the present invention are potent PI3K inhibitors, active in the enzymatic in vitro assay in the subnanomolar range and furthermore exhibit high activity also in THP-1 cellular model of PI3K delta inhibition.

Moreover the compounds according to the invention show persistent activity in vivo (duration of action) in the OVA test.

SUMMARY OF THE INVENTION

The present invention relates to compounds of formula (I)

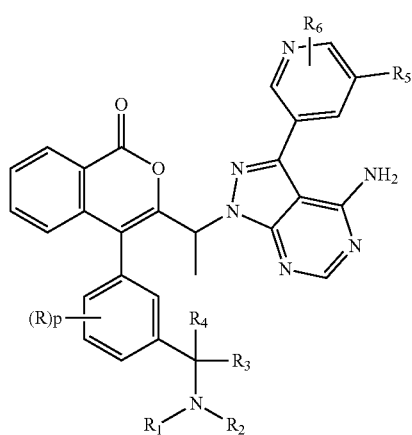

wherein R, $R_1$, $R_2$, $R_3$, $R_4$, $R_5$, $R_6$, are as reported below in the detailed description of the invention, acting as inhibitors of phosphoinositide 3-kinases, to processes for the preparation thereof, pharmaceutical compositions comprising them either alone or in combination with one or more active ingredient, in admixture with one or more pharmaceutically acceptable carrier.

In one aspect the present invention relates to a compound of the invention for use as a medicament.

In one aspect the present invention relates to the use of a compound of the invention for the manufacture of a medicament.

In a further aspect the present invention provides the use of a compound of the invention for the preparation of a medicament for the prevention and/or treatment of any disease characterized by phosphoinositide-3-kinase (PI3K) enzyme overactivity and/or wherein an inhibition of PI3K activity is desirable and in particular through the selective inhibition of the delta or of both the delta and the gamma enzyme isoforms over the alfa alpha and beta ones.

Moreover the present invention provides a method for prevention and/or treatment of any disease, preferably of respiratory diseases, wherein a PI3K enzyme inhibition is desirable, said method comprises administering to a patient in need of such treatment a therapeutically effective amount of a compound of the invention.

In particular the compounds of the invention are preferably for use in the prevention and/or treatment of a disease of the respiratory tract characterized by inflammatory airway obstruction such as, for example, cough, asthma, COPD and IPF.

A further aspect of the invention provides a suitable inhalation device, comprising a pharmaceutical composition of a compound of the invention, which may be respectively selected from a single- or multi-dose dry powder inhaler (DPI), a nebulizer and in particular a soft mist nebulizer.

A further aspect of the invention provides a kit comprising the pharmaceutical compositions of a compound of the invention either alone or in combination with one or more active ingredient and a device which may be a single- or multi-dose dry powder inhaler or a nebulizer.

DETAILED DESCRIPTION OF THE INVENTION

Definitions

The term "pharmaceutically acceptable salts", as used herein, refers to derivatives of compounds of formula (I) wherein the parent compound is suitably modified by converting any of the free acid or basic group, if present, into the corresponding addition salt with any base or acid conventionally intended as being pharmaceutically acceptable.

Suitable examples of said salts may thus include mineral or organic acid addition salts of basic residues such as amino groups, as well as mineral or organic basic addition salts of acid residues such as carboxylic groups.

Cations of inorganic bases which can be suitably used to prepare salts within the invention comprise ions of alkali or alkaline earth metals such as potassium, sodium, calcium or magnesium.

Those obtained by reacting the main compound, functioning as a base, with an inorganic or organic acid to form a salt comprise, for example, salts of hydrochloric acid, hydrobromic acid, sulfuric acid, phosphoric acid, methane sulfonic acid, camphor sulfonic acid, acetic acid, oxalic acid, maleic acid, fumaric acid, succinic acid and citric acid.

The term "halogen atoms" as used herein includes fluorine, chlorine, bromine, and iodine, preferably chlorine or fluorine.

The term "($C_1$-$C_x$) alkyl" where x is an integer greater than 1, refers to straight-chained or branched-chained alkyl groups wherein the number of constituent carbon atoms is in the range 1 to x. Particularly preferred alkyl groups are methyl, ethyl, n-propyl, isopropyl and tert-butyl.

The expressions "($C_1$-$C_x$) haloalkyl" refer to the above defined "($C_1$-$C_x$)alkyl" groups wherein one or more hydrogen atoms are replaced by one or more halogen atoms, which can be the same or different from each other.

Examples of said ($C_1$-$C_x$) haloalkyl groups may thus include halogenated, poly-halogenated and fully halogenated alkyl groups, e.g. trifluoromethyl or difluoro methyl groups.

By way of analogy, the terms "($C_1$-$C_x$) hydroxyalkyl" or "($C_1$-$C_x$) aminoalkyl" refer to the above defined "($C_1$-$C_x$) alkyl" groups wherein one or more hydrogen atoms are replaced by one or more hydroxy (OH) or amino group respectively.

In the present description, unless otherwise provided, the definition of aminoalkyl encompasses alkyl groups substituted by one or more ($NR_1R_2$).

With reference to the substituent $R_1$ and $R_2$ as above defined, it is here further explained that when $R_1$ and $R_2$ are taken together with the nitrogen atom they are linked to form a 5 to 6 membered heterocyclic radical, at least one further ring carbon atom in the said heterocyclic radical may be replaced by at least one heteroatom (e.g. N, NH, S or O) or may bear at least one -oxo (=O) substituent group. The said heterocyclic radical might be further optionally substituted on the available points in the ring, namely on a carbon atom, or on an heteroatom available for substitution. Thus, Examples of said heterocycle radicals are 1-pyrrolidinyl, 1-piperidinyl, 1-piperazinyl, 4-morpholinyl, piperazin-4yl-2-one, 4-methylpiperazine-1-yl.

The invention relates to a class of compounds acting as inhibitors of Phosphoinositide 3 Kinases (PI3K).

Said class of compounds inhibits the activity or function of the Class I of PI3K and more specifically, they are inhibitors derivatives of the activity or function of PI3Kα, PI3Kβ, PI3Kγ, and/or PI3Kδ isoforms of the Class I PI3K.

The present invention relates to compounds of formula (I):

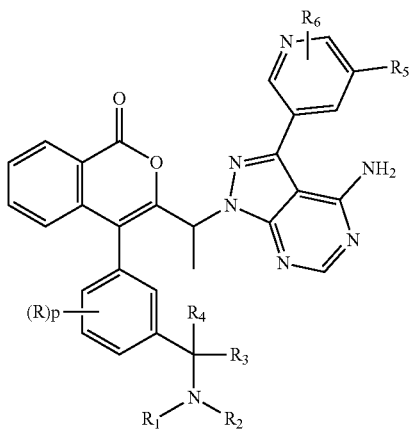

(I)

wherein:
each R, when present, is independently selected from the group consisting of: $OR_7$, halogen, $(C_1\text{-}C_6)$ alkyl;

$R_1$ and $R_2$ the same or different, are at each occurrence independently $(C_1\text{-}C_6)$ alkyl, $R_3$ and $R_4$ the same or different, in each occurrence are independently H or $(C_1\text{-}C_6)$ alkyl;

or $R_1$ and $R_2$ taken together with the nitrogen atom they are linked to, form a 5 or 6 membered heterocyclic radical, wherein at least one further ring carbon atom in the said heterocyclic radical is optionally replaced by at least one heteroatom (e.g. N, NH, S or O) and optionally bears at least one -oxo (=O) substituent group; the said heterocyclic radical is further optionally substituted by an $(C_1\text{-}C_6)$ alkyl group, and $R_3$ and $R_4$ are H;

or $R_3$ and $R_2$ taken together, form a 5 or 6 membered heterocyclic radical comprising the N atom; the said heterocyclic radical is further optionally substituted by an $(C_1\text{-}C_6)$ alkyl group, $R_1$ is an $(C_1\text{-}C_6)$ alkyl group and $R_4$ is H;

$R_5$ is $OR_7$;

$R_6$ is selected from the group consisting of: H, $OR_7$, $(C_1\text{-}C_6)$ alkyl, $(C_1\text{-}C_6)$ haloalkyl, $(C_1\text{-}C_6)$ hydroxyalkyl;

$R_7$ is selected from the group consisting of: H, $(C_1\text{-}C_6)$ alkyl;

p is zero or an integer ranging from 1 to 4, preferably is zero or 1, even more preferably when p is 1, R is halogen;

or pharmaceutically acceptable salts thereof.

It will be apparent to those skilled in the art that compounds of formula (I) contain at least one stereogenic center, namely represented in formula (Ia) by the carbon atom labelled with an asterisk (*), and therefore exist as optical stereoisomers.

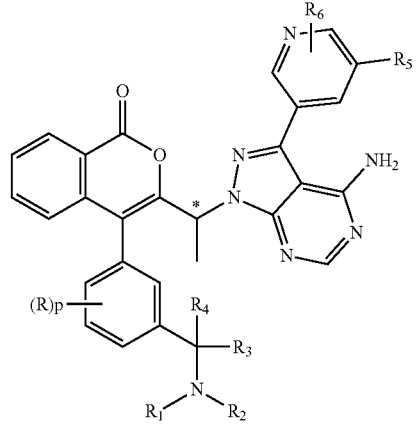

(Ia)

The compounds according to the invention having such at least one stereogenic center, they may accordingly exist as enantiomers. Where the compounds according to the invention possess two or more stereogenic centers, they may additionally exist as diastereoisomers. It is to be understood that all such single enantiomers, diastereoisomers and mixtures thereof in any proportion (herewith also referred to as racemate or racemic compound) are encompassed within the scope of the present invention. The absolute configuration (R) or (S) for carbon (*), being a stereogenic center, when determined is assigned on the basis of Cahn-Ingold-Prelog nomenclature rules based on groups' priorities.

The term "(R) and/or (S)" in the chemical name of a compound is intended to to still include in the scope either one or the other enantiomer or a blend in any proportion of the enantiomers (R) and (S) on the chiral carbon (*).

The term "(R) and/or(S)" in the chemical name of a compound is intended to still include in the scope either one or the other enantiomer or a blend in any proportion of the enantiomers (R) and(S) on the chiral carbon (*).

In a preferred embodiment, the present invention relates to compounds of formula (Ia) as above defined wherein the compound is in the form of one single or the other enantiomer, each obtained via a separation method (e.g. chromatography) or stereocontrolled synthesis in pure form, that is to say with enantiomeric enrichment of at least 95%, preferably more than 99%.

Thus, in one preferred embodiment, for a compound of formula (I), absolute configuration is (R) or (S) with reference to the stereogenic center represented in formula (Ia) by the carbon atom labelled with an asterisk (*):

In another preferred embodiment, the compounds of formula (I) described in the present invention are present as mixtures of enantiomers or diastereoisomers.

A first preferred group of compounds is that of formula (Ib)

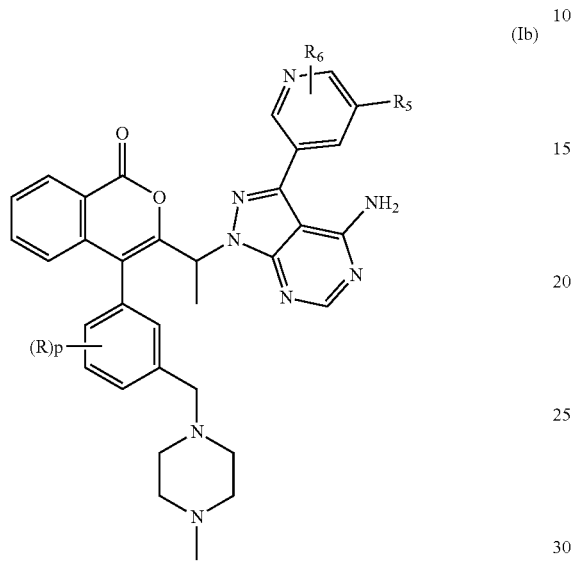

(Ib)

wherein with respect to formula (I):
$R_1$ and $R_2$ taken together with the nitrogen atom they are linked to, form a 4-methylpiperazine-1-yl group;
$R_3$ and $R_4$ are H; and
R, $R_5$, $R_6$ and p are as defined above;
or pharmaceutically acceptable salts thereof.

Particularly preferred in this group of compounds is at least one of the compounds selected from

| | |
|---|---|
| 3-{1-[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one; | 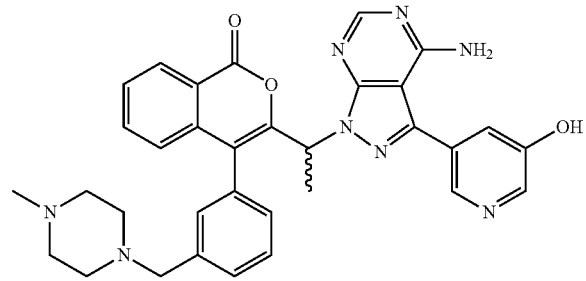 [SMILES: CC(c1oc(=O)c2ccccc2c1-c1cccc(CN2CCN(C)CC2)c1)n1nc(-c2cncc(O)c2)c2c(N)ncnc21] |
| 3-{1-[4-Amino-3-(5-hydroxypyridin-3-yl)-1H-pyrazolo[3,4-d]pyrimidin-1-yl]ethyl}-4-{4-fluoro-3-[(4-methylpiperazin-1-yl)methyl]phenyl}-1H-isochromen-1-one; | 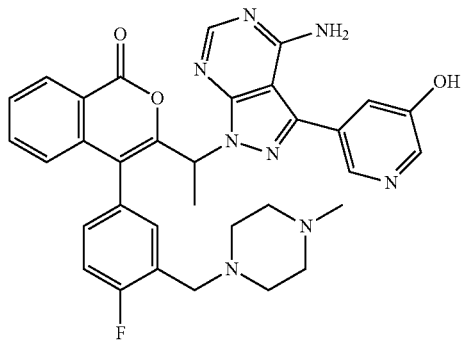 [SMILES: CC(c1oc(=O)c2ccccc2c1-c1ccc(F)c(CN2CCN(C)CC2)c1)n1nc(-c2cncc(O)c2)c2c(N)ncnc21] |

| 3-(1-(4-Amino-3-(5-hydroxypyridin-3-yl)-1H-pyrazolo[3,4-d]pyrimidin-1-yl)ethyl)-4-(3-fluoro-5-((4-methylpiperazin-1-yl)methyl)phenyl)-1H-isochromen-1-one; | 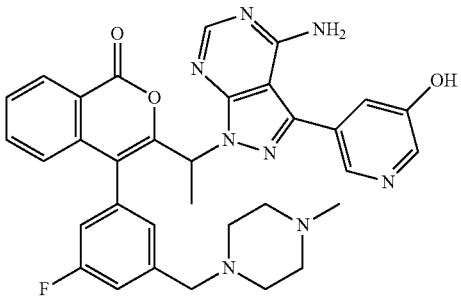 [SMILES: CC(c1oc(=O)c2ccccc2c1-c1cc(F)cc(CN2CCN(C)CC2)c1)n1nc(-c2cncc(O)c2)c2c(N)ncnc21] |

Another preferred group of compounds is that of formula (Ic)

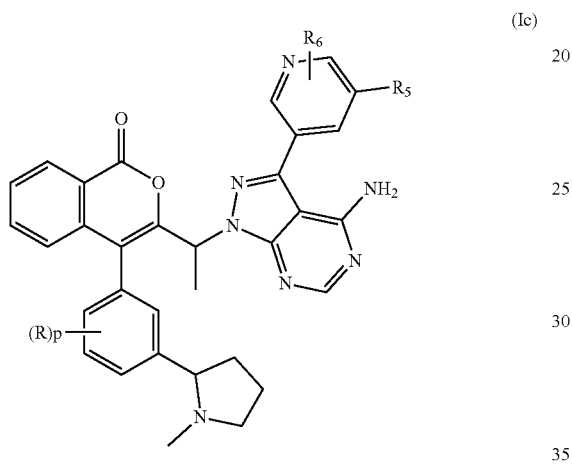

(Ic)

wherein, with respect to formula (I):
R₃ and R₂ taken together, form a 5 membered heterocyclic radical comprising the N atom; the said heterocyclic radical is further substituted by an (C₁-C₆) alkyl group which is methyl; R₁ is an (C₁-C₆) alkyl group which is methyl and R₄ is H; and
R, R₅, R₆ and p are as defined above;
or pharmaceutically acceptable salts thereof.
Particularly preferred in this group of compounds is at least

| 3-{1-[4-Amino-3-(5-hydroxypyridin-3-yl)-1H-pyrazolo[3,4-d]pyrimidin-1-yl]ethyl}-4-{3-[(2R)-1-methylpyrrolidin-2-yl]phenyl}-1H-isochromen-1-one; | 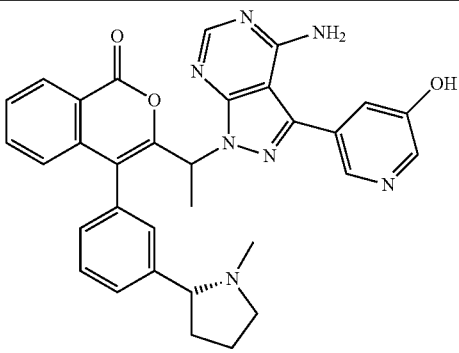 |

A further preferred group of compounds is that of formula (I) wherein:
R₁ and R₂ are (C₁-C₆) alkyl which is methyl,
R₃ and R₄ are independently H or (C₁-C₆) alkyl which is methyl; and R, R₅, R₆ and p are as defined above;
or pharmaceutically acceptable salts thereof.
Particularly preferred in this group of compounds is at least one of the compounds selected from those listed in the following table:

| | |
|---|---|
| 3-(1-(4-Amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one; | 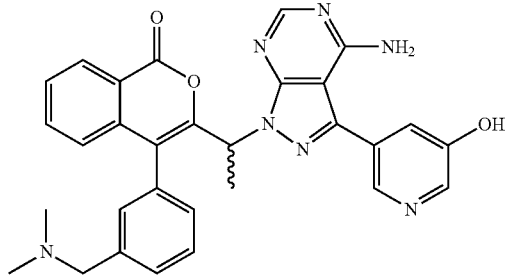 [SMILES: CC(c1oc(=O)c2ccccc2c1-c1cccc(CN(C)C)c1)n1nc(-c2cncc(O)c2)c2c(N)ncnc21] |
| 3-{1-[4-Amino-3-(5-hydroxypyridin-3-yl)-1H-pyrazolo[3,4-d]pyrimidin-1-yl]ethyl}-4-{4-chloro-3-[(dimethylamino)methyl]phenyl}-1H-isochromen-1-one; | 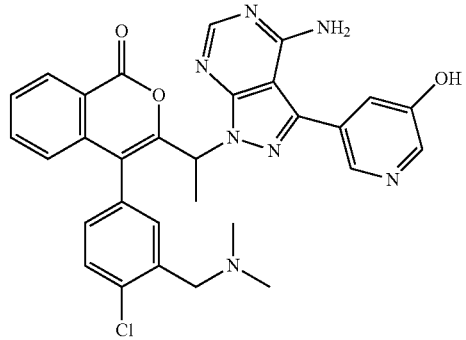 [SMILES: CC(c1oc(=O)c2ccccc2c1-c1ccc(Cl)c(CN(C)C)c1)n1nc(-c2cncc(O)c2)c2c(N)ncnc21] |
| 3-(1-(4-Amino-3-(5-hydroxypyridin-3-yl)-1H-pyrazolo[3,4-d]pyrimidin-1-yl)ethyl)-4-(3-(1-(dimethylamino)ethyl)phenyl)-1H-isochromen-1-one; | 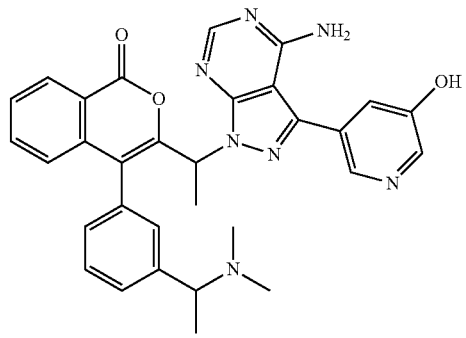 [SMILES: CC(c1cccc(-c2c(C(C)n3nc(-c4cncc(O)c4)c4c(N)ncnc43)oc(=O)c3ccccc23)c1)N(C)C] |

A further preferred group of compounds is that of formula (I) wherein:

R is —H;

$R_5$ is —OH;

$R_6$ is H;

$R_1$, $R_2$, $R_3$ and $R_4$ are as defined above;

or pharmaceutically acceptable salts thereof.

According to preferred embodiments, the present invention relates to at least one of the compound selected from those listed in the following table:

| | |
|---|---|
| 3-{1[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one; | 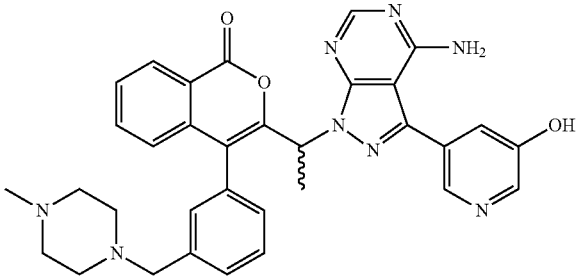 [SMILES: CC(c1oc(=O)c2ccccc2c1-c1cccc(CN2CCN(C)CC2)c1)n1nc(-c2cncc(O)c2)c2c(N)ncnc21] |

-continued 3-(1-(4-Amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one;

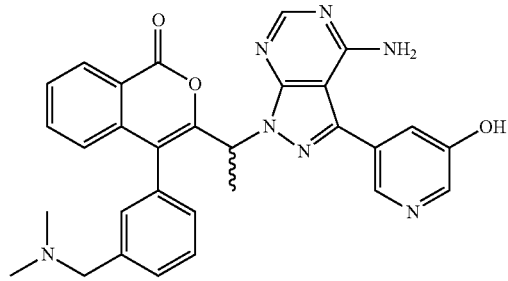 [SMILES: CC(c1oc(=O)c2ccccc2c1-c1cccc(CN(C)C)c1)n1nc(-c2cncc(O)c2)c2c(N)ncnc21]

3-{1-[4-Amino-3-(5-hydroxypyridin-3-yl)-1H-pyrazolo[3,4-d]pyrimidin-1-yl]ethyl}-4-{4-chloro-3-[(dimethylamino)methyl]phenyl}-1H-isochromen-1-one;

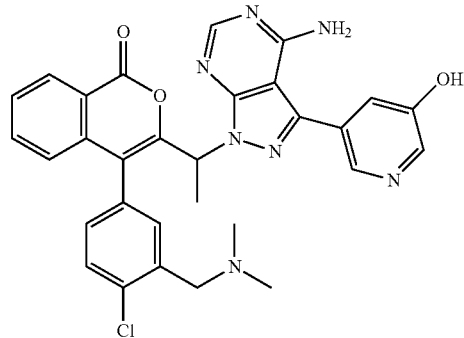 [SMILES: CC(c1oc(=O)c2ccccc2c1-c1ccc(Cl)c(CN(C)C)c1)n1nc(-c2cncc(O)c2)c2c(N)ncnc21]

3-{1-[4-Amino-3-(5-hydroxypyridin-3-yl)-1H-pyrazolo[3,4-d]pyrimidin-1-yl]ethyl}-4-{3-[(2R)-1-methylpyrrolidin-2-yl]phenyl}-1H-isochromen-1-one;

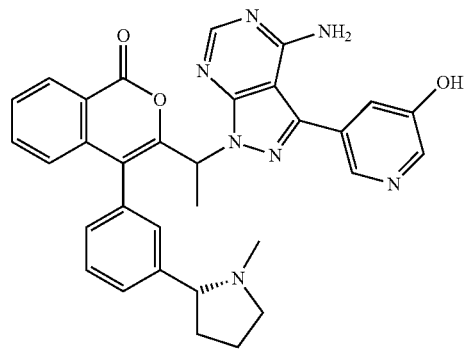

3-{1-[4-Amino-3-(5-hydroxypyridin-3-yl)-1H-pyrazolo[3,4-d]pyrimidin-1-yl]ethyl}-4-{4-fluoro-3-[(4-methylpiperazin-1-yl)methyl]phenyl}-1H-isochromen-1-one;

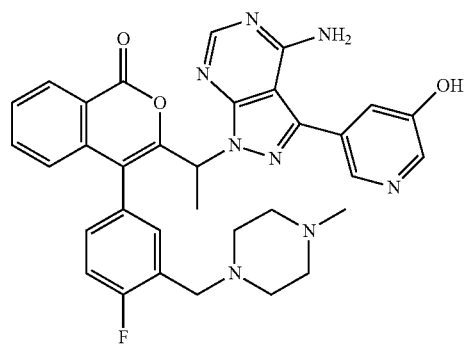 [SMILES: CC(c1oc(=O)c2ccccc2c1-c1ccc(F)c(CN2CCN(C)CC2)c1)n1nc(-c2cncc(O)c2)c2c(N)ncnc21]

3-(1-(4-Amino-3-(5-hydroxypyridin-3-yl)-1H-pyrazolo[3,4-d]pyrimidin-1-yl)ethyl)-4-(3-fluoro-5-((4-methylpiperazin-1-yl)methyl)phenyl)-1H-isochromen-1-one;

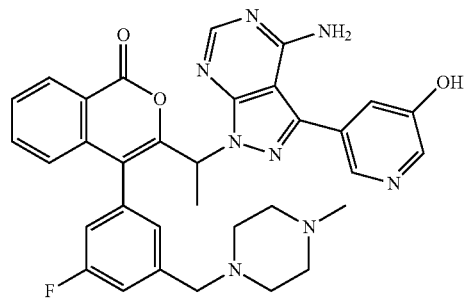 [SMILES: CC(c1oc(=O)c2ccccc2c1-c1cc(F)cc(CN2CCN(C)CC2)c1)n1nc(-c2cncc(O)c2)c2c(N)ncnc21]

| | |
|---|---|
| 3-(1-(4-Amino-3-(5-hydroxypyridin-3-yl)-1H-pyrazolo[3,4-d]pyrimidin-1-yl)ethyl)-4-(3-(1-(dimethylamino)ethyl)phenyl)-1H-isochromen-1-one; | 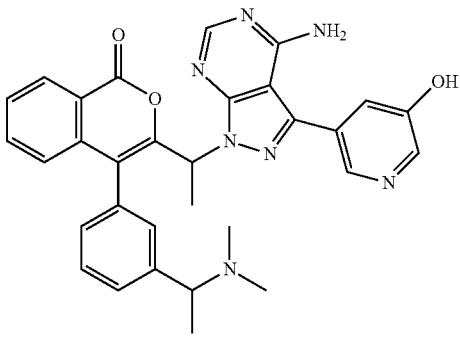 [SMILES: CC(c1cccc(-c2c(C(C)n3nc(-c4cncc(O)c4)c4c(N)ncnc43)oc(=O)c3ccccc23)c1)N(C)C] | and enantiomer or diastereoisomer mixtures in any proportion or single enantiomers or single diastereoisomers and pharmaceutically acceptable salt and solvates thereof.

Preferred salts according to the invention are selected from (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hydrobromide;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hydrochloride;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemi 1,5-Naphthalenedisulfonate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemi sulfate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Tosylate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Mesylate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one 2-Naphthalene sulfonate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Isethionate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Maleate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Esylate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemipamoate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Xinafoate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Salycilate;

(R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Benzoate.

Other preferred salts according to the invention are selected from (R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Hydrobromide;

(R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Hydrochloride;

(R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Mesylate;

(R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one 2-Naphthalene sulfonate;

(R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Maleate;

(R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Esylates.

In one embodiment the present invention provides a method for treating respiratory disorders comprising administering an effective amount of a compound according to the invention or a pharmaceutically acceptable salt thereof to a patient in need thereof.

In one aspect, the present invention refers to a compound of formula (I) for use as a medicament.

In one aspect the present invention provides the use of a compound of the invention for the manufacture of a medicament.

The compounds of formula (I) including all the compounds here above listed can be generally prepared according to the procedure outlined in detail in the Schemes shown below using generally known methods.

Schemes

Scheme 1

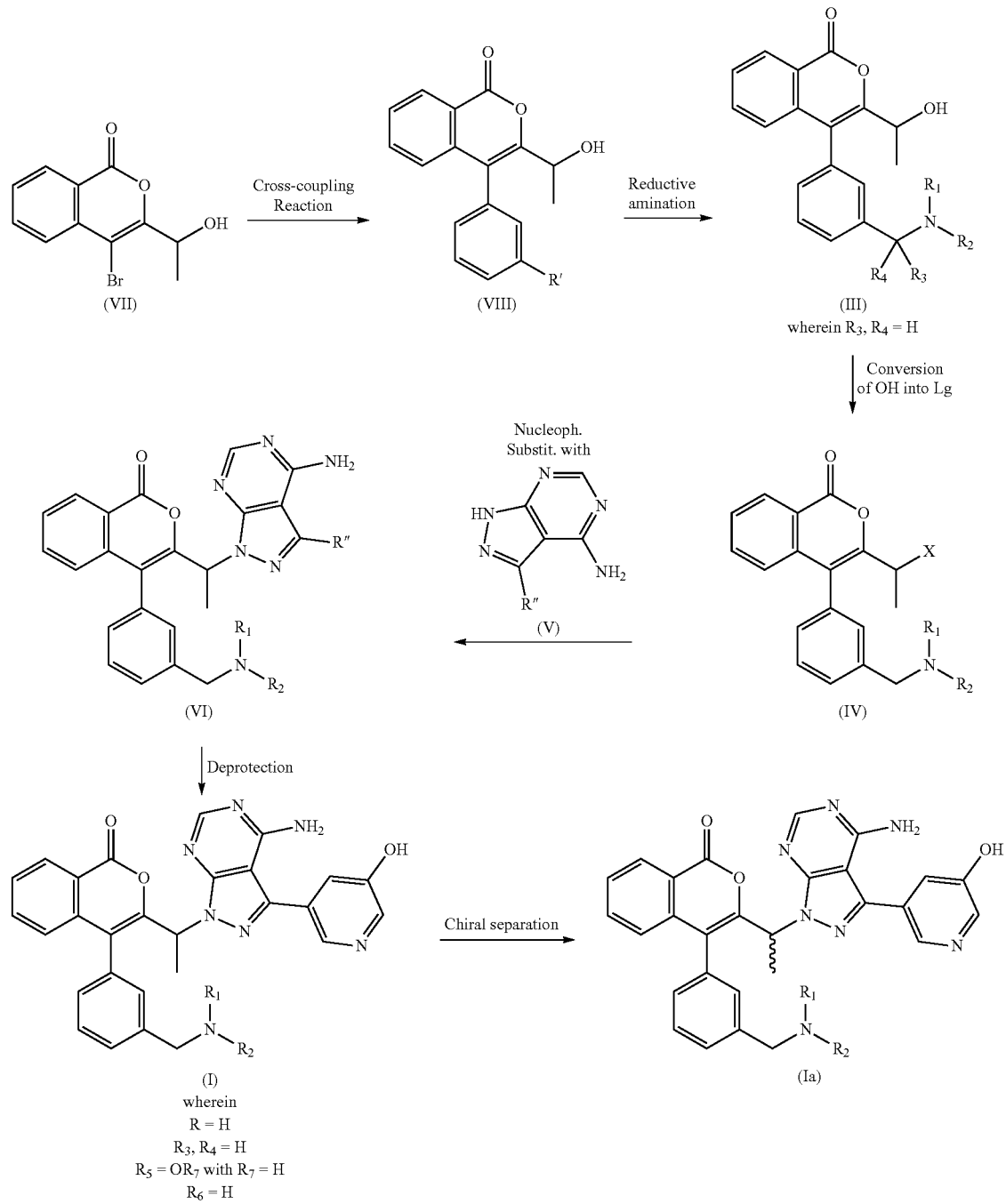

Scheme 1 provides a synthetic route for the preparation of Examples 1 and 2. Intermediate compounds of formula (VII), can be converted into Intermediates (VIII) by cross-coupling reactions, such as a Suzuki cross-coupling. Intermediates (VIII), wherein R' is a formyl group, can be converted into corresponding amines by reductive amination with suitable amines, such as 1-methylpiperazine or dimethylamine, in presence of reducing agents such as for example sodium triacetoxyborohydride. Intermediates (IV), where X is a suitable leaving group (Lg) such as a halide atom, can be prepared from Intermediates (III) through substitution of the hydroxyl group promoted by suitable halogenating agents such as for example $PBr_3$. Intermediates (VI) can be prepared by reaction of Intermediates (IV) with a suitable nucleophile, such as a nitrogen based nucleophile of formula (V) wherein R" is a protected hydroxypyridine e.g. methoxypyridine. Compounds (VI) can be deprotected in acidic conditions to give compound of formula (I) wherein $R_3$, $R_4$ are H, $R_6$ is H, $R_5$ is —OH and R is H.

Compounds of general structure (Ia) can be prepared from the corresponding racemic compound of formula (I) by means of chiral separation.
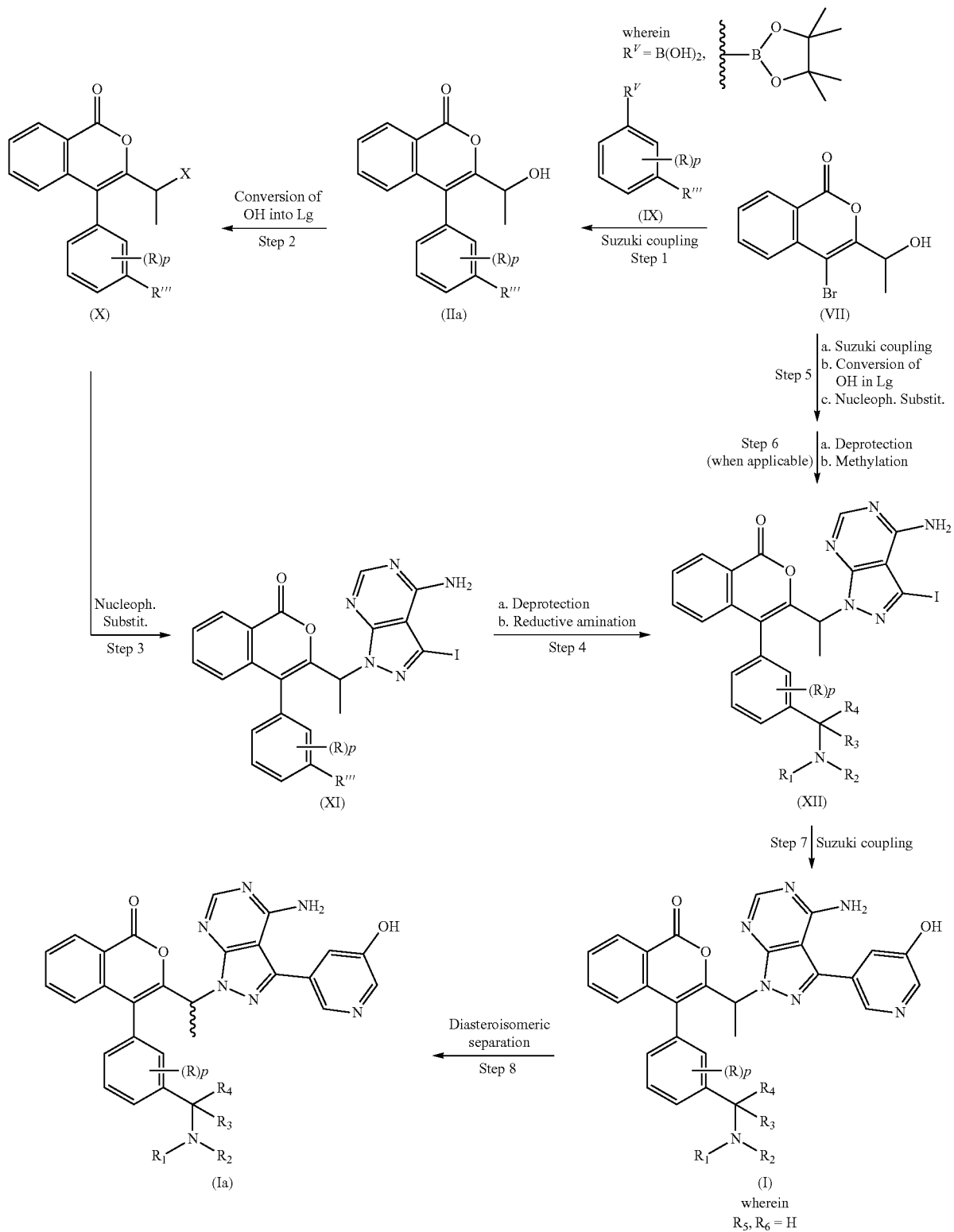

Examples 3-7 and 4a can be synthesized as outlined in Scheme 2, by using a methodology similar to the one described in Scheme 1. Intermediates of general formula (IIa), wherein (R)p is at least one suitable substituent as defined above, can be prepared from Intermediate (VII) and proper synthesized boronic acids or esters (e.g. pinacol esters) of formula (IX) where R'" is a formyl or protected formyl group. Intermediates (IIa) can be converted in Intermediates (X), where X represents a suitable Lg such as halide atom, by reaction with PBr$_3$, and subsequently reacted with commercially available 3-iodo-1H-pyrazolo[3,4-d]pyrimidine-4-amine to give Intermediates (XI). Intermediates (XII), wherein (R)p is a suitable substituent as above and R$_4$=R$_3$=H, can be prepared from Intermediates (XI) by de-protection of the aldehydic function through well-known procedures, followed by reductive amination with suitable amines such as for example 1-methylpiperazine or dimethylamine, in the presence of a reducing agent such as for example sodium triacetoxyborohydride (Scheme 2, step 4a,b). In another embodiment of the present invention Intermediates (XII), wherein R$_1$=R$_2$=R$_4$=H and R$_3$ is a suitable (C$_1$-C$_6$) alkyl substituent, can be prepared from Intermediate (VII) by means of a Suzuki coupling with suitable commercially available boronic acid or synthesized boronate esters, followed by the conversion of OH into a Lg such as a halide atom by reaction with PBr$_3$ and finally nucleophilic substitution with commercially available 3-iodo-1H-pyrazolo[3,4-d]pyrimidine-4-amine, according to Scheme 2, step 5a-c. Some compounds obtained after step 5 may contain a protected amino group which can be de-protected under well-known procedures and methylated through reductive amination to give Intermediates (XII) (Scheme 2, step 6a,b). Intermediates (XII) can be converted into compounds of general formula (I), wherein R$_6$ is H, R$_5$ is OH, by means of a Suzuki coupling with commercially available 5-(4,4,5,5-tetramethyl-[1,3,2]dioxaborolan-2-yl)pyridin-3-ol. Compounds of general structure (Ia) can be prepared from the corresponding racemic compound of formula (I) by means of chiral separation. E.g. enantiomerically pure Example 4a was prepared from the corresponding diasteromeric mixture by means of chromatographic separation.

In a specific aspect the present invention relates to compounds of formula (II)

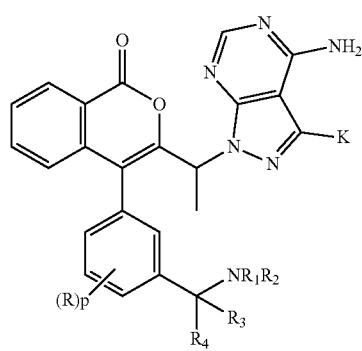

II wherein
when R=H, R$_3$ and R$_4$=H, K=R"=metoxypyridine; p, R$_1$ and R$_2$ are as defined above (corresponding to compound (VI) in scheme 1)

In a further aspect the present invention relates to the use of compounds of formula (II)

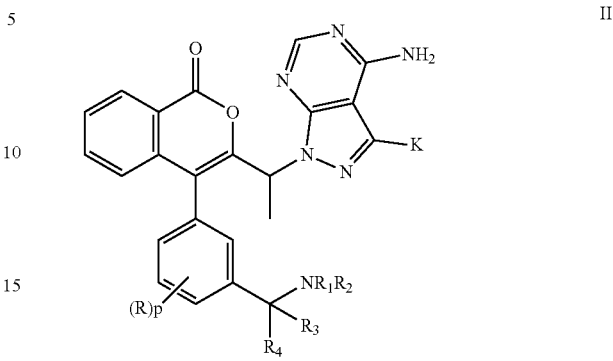

II wherein
when R=H, R$_3$ and R$_4$=H, K=R"=metoxypyridine; p, R$_1$ and R$_2$ are as defined above (corresponding to compound (VI) in scheme 1)
or
when K=I; p, R, R$_1$, R$_2$, R$_3$, R$_4$ are as defined above (corresponding to compound compound (XII) in scheme 2)
as intermediate in the preparation of compounds of formula (I) as above described.

The use of compounds of formula (II) as intermediate in the preparation of compounds of formula (I) is particularly useful in a process wherein compounds of formula (II) undergo subsequent steps of deprotection or coupling; followed by a final step of chiral separation.

The compounds of the invention are inhibitors of kinase activity, in particular PI3-kinase activity. Generally speaking, compounds which are PI3K inhibitors may be useful in the treatment of many disorders.

In one embodiment, the disorders that can be treated by the compounds of the present invention are respiratory diseases selected from cough such as idiopathic chronic cough, cough-variant asthma, cough associated with thoracic tumour or lung cancer, viral or post-viral cough, upper airways cough syndrome (UACS), post nasal drip cough, cough associated gastro-oesophageal reflux disease (both acid and non acid reflux), asthma, chronic bronchitis, chronic obstructive pulmonary disease (COPD) and interstitial lung disease (such as idiopathic pulmonary fibrosis (IPF)).

In a further embodiment, the disorder is selected from asthma, chronic obstructive pulmonary disease (COPD).

In a further embodiment, the disorder is selected from idiopathic pulmonary fibrosis (IPF), cough and chronic cough.

The methods of treatment of the invention comprise administering an effective amount of a compound of formula (I) or a pharmaceutically acceptable salt thereof to a patient in need thereof. As used herein, "effective amount" in reference to a compound of formula (I) or a pharmaceutically acceptable salt thereof or other pharmaceutically-active agent means an amount of the compound sufficient to treat the patient's condition but low enough to avoid serious side effects and it can nevertheless be routinely determined by the skilled artisan. The compounds of formula (I) or pharmaceutically acceptable salts thereof may be administered once or according to a dosing regimen wherein a number of doses are administered at varying intervals of time for a given period of time. Typical daily dosages may vary depending upon the particular route of administration chosen.

The invention also provides pharmaceutical compositions of compounds of formula (I) in admixture with one or more pharmaceutically acceptable carrier or excipient, for example those described in Remington's Pharmaceutical Sciences Handbook, XVII Ed., Mack Pub., N.Y., U.S.A.

Administration of the compounds of the present invention and their pharmaceutical compositions may be accomplished according to patient needs, for example, orally, nasally, parenterally (subcutaneously, intravenously, intramuscularly, intrasternally and by infusion), by inhalation, rectally, vaginally, topically, locally, transdermally, and by ocular administration.

Various solid oral dosage forms can be used for administering compounds of the invention including such solid forms as tablets, gelcaps, capsules, caplets, granules, lozenges and bulk powders. The compounds of the present invention can be administered alone or combined with various pharmaceutically acceptable carriers, diluents (such as sucrose, mannitol, lactose, starches) and known excipients, including suspending agents, solubilizers, buffering agents, binders, disintegrants, preservatives, colorants, flavorants, lubricants and the like. Time release capsules, tablets and gels are also advantageous in administering the compounds of the present invention.

Various liquid oral dosage forms can also be used for administering compounds of the invention, including aqueous and non-aqueous solutions, emulsions, suspensions, syrups, and elixirs. Such dosage forms can also contain suitable known inert diluents such as water and suitable known excipients such as preservatives, wetting agents, sweeteners, flavorants, as well as agents for emulsifying and/or suspending the compounds of the invention. The compounds of the present invention may be injected, for example, intravenously, in the form of an isotonic sterile solution. Other preparations are also possible.

For the treatment of the diseases of the respiratory tract, the compounds according to the invention are preferably administered by inhalation.

Inhalable preparations include inhalable powders, propellant-containing metering aerosols or propellant-free inhalable formulations and may be administered through a suitable inhalation device which may be respectively selected from dry powder inhaler, pressurized metered dosed inhaler, or a nebulizer.

For administration as a dry powder, single- or multi-dose inhalers known from the prior art may be utilized. In that case the powder may be filled in gelatine, plastic or other capsules, cartridges or blister packs or in a reservoir. A diluent or carrier, e.g. lactose or any other additive suitable for improving the respirable fraction may be added to the powdered compounds of the invention.

Inhalation aerosols containing propellant gas such as hydrofluoroalkanes may contain the compounds of the invention either in solution or in dispersed form. The propellant-driven formulations may also contain other ingredients such as co-solvents, stabilizers and optionally other excipients.

The propellant-free inhalable formulations comprising the compounds of the invention may be in form of solutions or suspensions in an aqueous, alcoholic or hydroalcoholic medium and they may be delivered by jet or ultrasonic nebulizers known from the prior art or by soft-mist nebulizers such as Respimat®, a registered trademark of Boehringer Ingelheim Pharmaceuticals (Wachtel, H., Kattenbeck, S., Dunne, S. et al. Pulm Ther (2017) 3:19. doi. org/10.1007/s41030-017-0040-8).

According to a particularly preferred embodiment the compositions of the invention are in the form of a dry powder formulation, wherein a carrier is present comprising fine and/or coarse particles of one or more pharmaceutically acceptable excipient, and further optionally an additive is present with lubricant or anti-adherent properties.

Preferably the carrier coarse particles have a mass diameter comprised between 30 and 500 micron.

The carrier is generally a crystalline sugar selected from the group consisting of glucose, arabinose, maltose, saccharose, dextrose and lactose or a polyalcohol selected from the group consisting of mannitol, maltitol, lactitol and sorbitol; and the additive materials are selected form the group consisting of amino acids, water soluble surface active agents, lubricants and glidants.

Preferably the carrier particles are particles of of alpha-lactose or beta-lactose, even more preferably are particles of alpha-lactose monohydrate.

Another preferred embodiment of the invention is a dry powder inhaler device filled with a pharmaceutical formulation in the form of a dry powder formulation as above defined.

A further preferred embodiment is a kit comprising a pharmaceutical formulation as defined above and a dry powder inhaler device.

The dry powder formulation according to the invention may be prepared according to known methods such as those described in WO0053157A1 and WO 96/23485

According to an alternative preferred embodiment the composition of the invention are in the form of a propellant-free pharmaceutical formulation for administration to the lung via nebulization wherein, the said compound or salt thereof, is dissolved or suspended in an aqueous vehicle, optionally comprising further pharmaceutically acceptable excipients.

Thus, a further preferred embodiment is a kit comprising a pharmaceutical formulation, that is a solution or a suspension of the compounds of the invention as above indicated, and a nebulizer.

The compounds of the invention can be administered as the sole active agent or in combination with other pharmaceutical active ingredients including those currently used in the treatment of respiratory disorders, and known to the skilled person.

The dosages of the compounds of the invention depend upon a variety of factors including the particular disease to be treated, the severity of the symptoms, the route of administration, the frequency of the dosage interval, the particular compound utilized, the efficacy, toxicology profile, and pharmacokinetic profile of the compound.

The following examples illustrate the invention without limiting its scope.

PREPARATIONS OF INTERMEDIATES AND EXAMPLES

Chemical Names of the compounds were generated with Structure To Name Enterprise 10.0 Cambridge Software.
Abbreviations $Et_2O$=diethyl ether; $Et_3N$=triethyl amine; DCE=1,2-dichloroethane; TEA=triethyl amine; DCC=N,N'-Dicyclohexylcarbodiimide; HOBt=Hydroxybenzotriazole; HATU=(Dimethylamino)-N,N-dimethyl(3H-[1,2,3]triazolo[4,5-b]pyridin-3-yloxy)methaniminium hexafluorophosphate; HBTU=N,N,N',N'-Tetramethyl-O-(1H-benzotriazol-1-yl) uronium hexafluorophosphate, O-(Benzotriazol-1-yl)-N,N,N',N'-tetramethyluronium hexafluorophosphate; EDC=1- ethyl-3-(3-dimethylaminopropyl) carbodiimide hydrochloride; DMAP=4-dimethylaminopyridine; DMF=dimethylformamide; EtOAc=Ethyl acetate; RT=room temperature; THF=tetrahydrofuran; DCM=dichloromethane; MeOH=methyl alcohol; EtOH=ethylic alcohol; LHMDS=Lithium bis(trimethylsilyl) amide; m-CPBA=meta-Chloroperoxybenzoic acid; TFA=Trifluoroacetic acid; LC-MS=Liquid Chromatography/Mass Spectrometry; HPLC=high pressure liquid chromatography; MPLC=medium pressure liquid chromatography; SFC=Supercritical Fluid Chromatography; dppf=1,1'-Bis(diphenylphosphino) ferrocene; X-Phos-Pd-G2=Chloro(2-dicyclohexylphosphino-2',4',6'-triisopropyl-1,1'-biphenyl)[2-(2'-amino-1,1'-biphenyl)]palladium(II); S-Phos-Pd-G2=Chloro(2-dicyclohexylphosphino-2',6'-dimethoxy-1,1'-biphenyl)[2-(2'-amino-1,1'-biphenyl)]palladium(II); DIEA or DIPEA=N,N-Diisopropylethylamine; MeCN=Acetonitrile; MTBE=tert-Butyl methyl ether; Ac2O=acetic anhydride; AcCl=acetyl chloride; HBTU=N,N,N',N'-Tetramethyl-O-(1H-benzotriazol-1-yl)uronium hexafluorophosphate, O-(Benzotriazol-1-yl)-N,N,N',N'-tetramethyluronium hexafluorophosphate; TBDMSCl=tert-Butyl(chloro)dimethylsilane; DMSO=Dimethylsulfoxide; BoC2O=di-tert-butyl dicarbonate; UPLC=Ultra Performance Liquid Chromatography.

General Experimental Details $^1$H-NMR spectra were performed on a Varian MR-400 spectrometer operating at 400 MHZ (proton frequency), equipped with: a self-shielded Z-gradient coil 5 mm 1H/nX broadband probe head for reverse detection, deuterium digital lock channel unit, quadrature digital detection unit with transmitter offset frequency shift, or on AgilentVNMRS-500 or on a Bruker Avance 400 spectrometers. Chemical shift are reported as δ values in ppm relative to trimethylsilane (TMS) as an internal standard. Coupling constants (J values) are given in hertz (Hz) and multiplicities are reported using the following abbreviation (s=singlet, d=doublet, t=triplet, q=quartet, m=multiplet, br. s=broad, nd=not determined).

LC/UV/MS Analytical Methods

LC/MS retention times are estimated to be affected by an experimental error of +0.5 min. LCMS may be recorded under the following conditions: diode array DAD chromatographic traces, mass chromatograms and mass spectra may be taken on UPLC/PDA/MS Acquity™ system coupled with Micromass ZQ™ or Waters SQD single quadrupole mass spectrometer operated in positive and/or negative electron spray ES ionization mode and/or Fractionlynx system used in analytical mode coupled with ZQ™ single quadrupole operated in positive and/or negative ES ionisation mode. Quality Control methods used operated under low pH conditions or under high pH conditions.

Method 1. Aquity UPLC-QDa Mass Spectrometer with a C18-reverse-phase column (50×2.1 mm Acquity CSH with 1.7 μm particle size) maintained at 40° C., elution with A: 95/5 water/acetonitrile+0.05% formic acid; B: 95/5 acetonitrile/water+0.05% formic acid.

Gradient:

| Gradient-Time | flow (mL/min) | % A | % B |
|---|---|---|---|
| 0.00 | 1 | 99.0 | 1.0 |
| 1.50 | 1 | 0.1 | 99.9 |
| 1.90 | 1 | 0.1 | 99.9 |
| 2.00 | 1 | 99.0 | 1.0 |

Detection-MS, UV PDA

MS ionisation method-Electrospray (positive/negative ion).

Method 2, low pH conditions. Column: Acquity UPLC BEH C18, 1.7 μm, 2.1×50 mm, the column temperature was 40° C.; mobile phase solvent A was milliQ water+0.1% HCOOH, mobile phase solvent B MeCN+0.1% HCOOH. The flow rate was 1 mL/min. The gradient table was t=0 min 97% A-3% B, t=1.5 min 0.1% A-99.9% B, t=1.9 min 0.1% 0.1% A-99.9% B and t=2 min 97% A-3% B. The UV detection range was 210-350 nm and ES+/ES− range was 100=1000 amu.

Method 3, low pH conditions. Column: Acquity CSH C18, 1.7 μm, 2.1×50 mm, the column temperature was 40° C.; mobile phase solvent A was milliQ water+0.1% HCOOH, mobile phase solvent B MeCN+0.1% HCOOH. The flow rate was 1 mL/min. The gradient table was t=0 min 97% A-3% B, t=1.5 min 0.1% A-99.9% B, t=1.9 min 0.1% 0.1% A-99.9% B and t=2 min 97% A-3% B. The UV detection range was 210-350 nm and ES+/ES− range was 100=1000 amu.

Method 4. Aquity UPLC-QDa Mass Spectrometer with a C18-reverse-phase column (50×2.1 mm Acquity CSH with 1.7 μm particle size) maintained at 40° C., elution with A: 95/5 water/acetonitrile+0.05% formic acid; B: 95/5 acetonitrile/water+0.05% formic acid.

Gradient:

| Gradient-Time | flow (mL/min) | % A | % B |
|---|---|---|---|
| 0.00 | 1 | 99.0 | 1.0 |
| 3.50 | 1 | 0.1 | 99.9 |
| 3.90 | 1 | 0.1 | 99.9 |
| 4.00 | 1 | 99.0 | 1.0 |

Detection-MS, UV PDA

MS ionisation method-Electrospray (positive/negative ion).

Method 5, high pH conditions. Column: Acquity UPLC BEH C18, 1.7 μm, 2.1×50 mm, the column temperature was 40° C.; mobile phase solvent A was 10 mM aqueous solution of $NH_4HCO_3$ adjusted to pH=10 with ammonia, mobile phase solvent B MeCN. The flow rate was 1 mL/min. The gradient table was t=0 min 97% A-3% B, t=1.5 min 0.1% A-99.9% B, t=1.9 min 0.1% 0.1% A-99.9% B and t=2 min 97% A-3% B. The UV detection range was 210-350 nm and ES+/ES− range was 100=1000 amu.

Analytical Chiral for Chiral Compounds

The enantiomeric access of chiral compounds was determined by chiral HPLC analysis on a HPLC Agilent 1100 equipped with 6-position switching valve, DAD, and CD detectors. The following methods were used:

Method A1, Column: Chiralpak IC (25×0.46 cm), 5 μm; Mobile phase: n-Hexane/(Ethanol/Dichloromethane 90/10% v/v+0.1% isopropylamine) 80/10% v/v; Flow rate: 1.0 mL/min; DAD: 220 nm.

Method A2, Column: Whelk 0-1 (R,R) (25×0.46 cm), 10 μm; Mobile phase: n-Hexane/(2-Propanol/Methanol 1/1+ 0.1% isopropylamine) 30/70% v/v; Flow rate: 1.0 mL/min; DAD: 220 nm.

Method A3, Column: Chiralpak AD-H (25×0.46 cm), 5 μm; Mobile phase: n-Hexane/(Ethanol+0.1% isopropylamine) 75/25% v/v; Flow rate: 1.0 mL/min; DAD: 220 nm.

Method A4, Column: Chiralpak AD-H (25×0.46 cm), 5 μm; Mobile phase: (2-Propanol+0.1% isopropylamine) 32%; Flow rate: 2.5 mL/min; DAD: 220 nm.

Flash chromatography is carried out using an Isolera MPLC system (manufactured by Biotage) using pre-packed silica gel or reverse-phase cartridges (Supplied by Biotage). Many of the compounds described in the following Examples have been prepared from Stereochemically pure starting materials, for example 95% ee. The stereochemistry of the compounds in the Examples, where indicated, has been assigned on the assumption that absolute configuration at resolved stereogenic centers of starting materials is maintained throughout any Subsequent reaction conditions. In the procedures that follow, after each starting material, reference to a compound number is sometimes provided. This is provided merely for assistance to the skilled chemist. The starting material may not necessarily have been prepared from the batch referred to. When reference is made to the use of a "similar" or "analogous" procedure, as will be appreciated by those skilled in the art. Such a procedure may involve minor variations, for example reaction temperature, reagent/solvent amount, reaction time, work-up conditions or chromatographic purification conditions.

PREPARATION OF INTERMEDIATES

Intermediate A1: 3-(3-(1-Hydroxyethyl)-1-oxo-1H-isochromen-4-yl)benzaldehyde

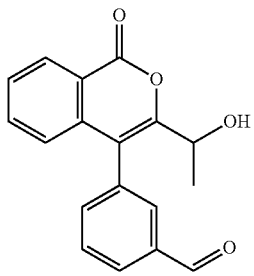 [SMILES: CC(O)c1oc(=O)c2ccccc2c1-c1cccc(C=O)c1]

In a 500 mL 3-necked round bottomed flask (3-formylphenyl)boronic acid (1 g, 6.67 mmol) 4-bromo-3-(1-hydroxyethyl)-1H-isochromen-1-one (Intermediate A2 in WO 2015091685) (2.15 g, 8.00 mmol) and potassium phosphate hydrate (4.61 g, 20.01 mmol) were loaded then THF (50 mL) and Water (50 mL) were added. Argon was bubbled for 10 min then XPhos-Pd-G2 (0.367 g, 0.467 mmol) was added. Bubbling was continued for further 10 min and then brown turbid mixture was stirred under Argon atmosphere overnight. The mixture was poured into 300 mL of water then extracted twice with 200 mL of EtOAc. The organic phase was dried over sodium sulfate, filtered and concentrated. The crude was purified by chromatography (SNAP 340 g) eluting with Hexane\EtOAc mixtures to leave 3-(3-(1-hydroxyethyl)-1-oxo-1H-isochromen-4-yl)benzaldehyde as a gummy solid (0.110 g, 0.374 mmol, 6% yield).

UPLC-MS: 1.45 min, 295.1.06 [M+H]+, method 4.

Intermediate A2: 4-[4-Chloro-3-(4,4,5,5-tetramethyl-1,3-dioxolan-2-yl)phenyl]-3-(1-hydroxyethyl)-1H-isochromen-1-one

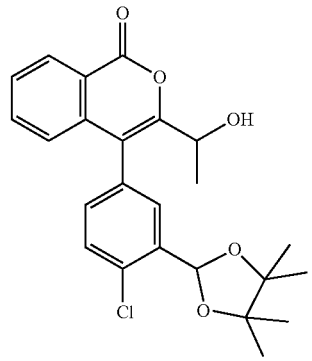 [SMILES: CC(O)c1oc(=O)c2ccccc2c1-c1ccc(Cl)c(C2OC(C)(C)C(C)(C)O2)c1]

Step 1. 2-Chloro-5-(tetramethyl-1,3-dioxaborolan-2-yl)benzaldehyde (Intermediate A2.1)

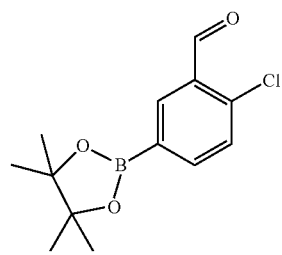 [SMILES: CC1(C)OB(c2ccc(Cl)c(C=O)c2)OC1(C)C]

A mixture of 5-bromo-2-chlorobenzaldehyde (1.50 g, 6.83 mmol), bis(pinacolato)diboron (2.08 g, 8.20 mmol), potassium acetate (1.34 g, 13.66 mmol) and Pd(dppf)Cl$_2$ (0.150 g, 0.205 mmol) in anhydrous 1,4-dioxane (22.5 mL) was heated at 100° C. under N$_2$ overnight. After cooling to r.t., the reaction mixture was diluted with AcOEt, filtered through a Celite pad and the solvent was removed under vacuum. The residue, 2-chloro-5-(tetramethyl-1,3,2-dioxaborolan-2-yl)benzaldehyde (6.83 mmol theoric), was not further purified, but used as such in the subsequent step.

UPLC-MS: 0.86 min, 267.06 [M+H]+, method 2.

Step 2. 2-[4-Chloro-3-(4,4,5,5-tetramethyl-1,3-dioxolan-2-yl)phenyl]-4,4,5,5-tetramethyl-1,3,2-dioxaborolane (Intermediate A2.2)

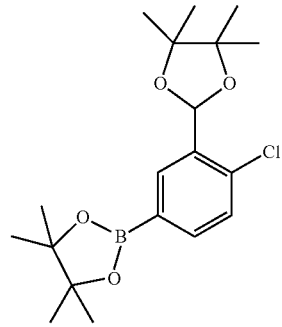 [SMILES: CC1(C)OB(c2ccc(Cl)c(C3OC(C)(C)C(C)(C)O3)c2)OC1(C)C]

A mixture of 2-chloro-5-(tetramethyl-1,3,2-dioxaborolan-2-yl)benzaldehyde (Intermediate A2.1) (crude, 6.83 mmol theoric) and pinacol (3.23 g, 27.32 mmol) was dissolved in 25.0 mL toluene. Then p-toluensulfonic acid monohydrate (0.065 g, 0.342 mmol) was added and the mixture was heated at 90° C. for 5 h. Then p-toluensulfonic acid monohydrate (0.100 g, 0.526 mmol) was added and the mixture was heated at 90° C. overnight. The mixture was concentrated in vacuum and the residue was solubilized in 20 mL of isopropanol. Then 30 mL of water were slowly added. Upon addition a solid precipitated and it was collected by filtration to give 2-[4-chloro-3-(4,4,5,5-tetramethyl-1,3-dioxolan-2-yl)phenyl]-4,4,5,5-tetramethyl-1,3,2-dioxaborolane as a brown solid residue (2.24 g, 6.11 mmol, 89%).

UPLC-MS: 1.53 min, 367.11 [M+H]+, method 2.

Step 3. 4-[4-Chloro-3-(4,4,5,5-tetramethyl-1,3-dioxolan-2-yl)phenyl]-3-(1-hydroxyethyl)-1H-isochromen-1-one The title compound was made in a similar way as that of Intermediate A1 using 4-bromo-3-(1-hydroxyethyl)-1H-isochromen-1-one (Intermediate A2 in WO 2015091685) (1 g, 3.72 mmol), 2-[4-chloro-3-(4,4,5,5-tetramethyl-1,3-dioxolan-2-yl)phenyl]-4,4,5,5-tetramethyl-1,3,2-dioxaborolane (Intermediate A2.2) (1.24 g, 3.38 mmol), K₃PO₄ (2.153 g, 10.14 mmol) and XPhos-Pd-G2 (0.133 g, 0.169 mmol). After work-up the residue was purified by flash chromatography on a 100 g silica gel Biotage SNAP column (eluent: gradient of AcOEt in cyclohexane from 5 to 50%). Evaporation of opportune fractions provided 4-[4-chloro-3-(4,4,5,5-tetramethyl-1,3-dioxolan-2-yl)phenyl]-3-(1-hydroxyethyl)-1H-isochromen-1-one as an off-white solid (0.458 g, 1.067 mmol, 32% yield).

UPLC-MS: 1.19 min, 429.3 [M+H]+, method 3.

Intermediate A3: (2R)-2-{3-[3-(1-hydroxyethyl)-1-oxo-1H-isochromen-4-yl]phenyl}pyrrolidine-1-carboxylate

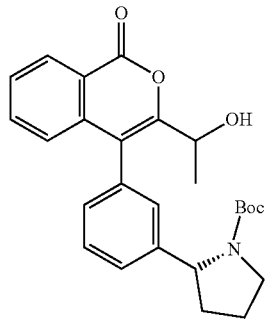

Step 1. Tert-Butyl (2R)-2-(3-bromophenyl)pyrrolidine-1-carboxylate (Intermediate A3.1)

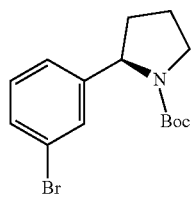 [SMILES: CC(C)(C)OC(=O)N1CCC[C@@H]1c1cccc(Br)c1]

To a stirred solution of (2S)-2-(3-bromophenyl)pyrrolidine hydrochloride (1.00 g, 3.81 mmol) in DCM (12 mL) at 0° C. and under a nitrogen atmosphere, TEA (0.58 mL, 4.19 mmol) was added followed by a solution of Boc₂O (1.08 g, 4.95 mmol) in DCM (4 mL) portion-wise. The ice-bath was then removed and the resulting reaction mixture was stirred overnight at r.t. The mixture was diluted with DCM, washed with saturated water solution of NaHCO₃, dried over Na₂SO₄ and concentrated under reduced pressure. The crude material was purified by FC on silica (Snap 25, eluting with Cy/EA from 100/0 to 90/10) to give tert-butyl (2R)-2-(3-bromophenyl)pyrrolidine-1-carboxylate (1.15 g, 3.53 mmol, 92%).

UPLC-MS: 1.32 min, 327.1 [M+H]+, method 3.

Step 2. Tert-Butyl (2R)-2-[3-(tetramethyl-1,3,2-dioxaborolan-2-yl)phenyl]pyrrolidine-1-carboxylate (Intermediate A3.2)

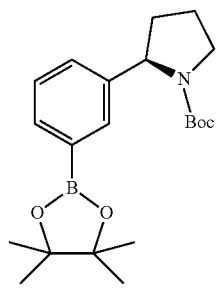 [SMILES: CC(C)(C)OC(=O)N1CCC[C@@H]1c1cccc(B2OC(C)(C)C(C)(C)O2)c1]

A mixture of tert-butyl (2R)-2-(3-bromophenyl)pyrrolidine-1-carboxylate (Intermediate A3.1) (1.15 g, 3.53 mmol), bis(pinacolato)diboron (1.34 g, 5.28 mmol), potassium acetate (0.70 g, 7.10 mmol) and Pd(dppf)Cl₂ (0.080 g, 0.11 mmol) in anhydrous 1,4-dioxane (13 mL) was shaken in a capped vial at 100° C. for 6 h. Further bis(pinacolato)diboron (0.32 g, 1.26 mmol), AcOK (0.21 g, 2.14 mmol) and Pd(dppf)Cl₂ (0.024 g, 0.033 mmol) were added and the mixture was shaken at 100° C. for additional 5 h. The reaction mixture was diluted with EtOAc, filtered and the solvent removed under reduced pressure. The crude material was purified by FC on silica (Snap 50, eluting with Cy/EA from 100/0 to 90/10) affording tert-butyl (2R)-2-[3-(tetramethyl-1,3,2-dioxaborolan-2-yl)phenyl]pyrrolidine-1-carboxylate as whitish waxy solid (1.23 g, 3.29 mmol, 93%).

UPLC-MS: 1.41 min, 374.3 [M+H]+, method 3.

Step 3. 4 Tert-Butyl (2R)-2-{3-[3-(1-hydroxyethyl)-1-oxo-1H-isochromen-4-yl]phenyl}pyrrolidine-1-carboxylate The title compound was made in a similar way as that of Intermediate A1 using 4-bromo-3-(1-hydroxyethyl)-1H-isochromen-1-one (Intermediate A2 in WO 2015091685) (1.33 g, 4.94 mmol), (2R)-2-[3-(tetramethyl-1,3,2-dioxaborolan-2-yl)phenyl]pyrrolidine-1-carboxylate (Intermediate A3.2) (1.23 g, 3.29 mmol), K₃PO₄ (2.10 g, 9.87 mmol) and X-Phos-Pd(crotyl)Cl (0.11 g, 0.16 mmol). After work-up the residue was purified by flash chromatography on a 55 g silica-NH Biotage SNAP column (eluent: gradient of AcOEt in cyclohexane from 0 to 35%). Evaporation of opportune fractions provided 4 tert-butyl (2R)-2-{3-[3-(1-hydroxyethyl)-1-oxo-1H-isochromen-4-yl]phenyl}pyrrolidine-1-carboxylate as dark oil (0.89 g, 2.04 mmol, 62%).

UPLC-MS: 1.19 min, 436.3 [M+H]+, method 3.

Intermediate A4: 4-[4-Fluoro-3-(4,4,5,5-tetramethyl-1,3-dioxolan-2-yl)phenyl]-3-(1-hydroxyethyl)-1H-isochromen-1-one

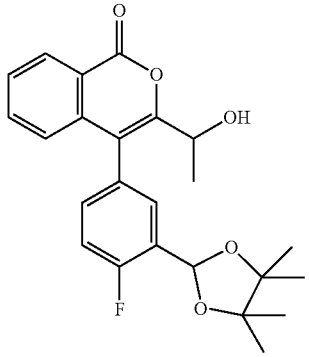 [SMILES: CC(O)c1oc(=O)c2ccccc2c1-c1ccc(F)c(C2OC(C)(C)C(C)(C)O2)c1]

Step 1. 2-[4-Fluoro-3-(4,4,5,5-tetramethyl-1,3-dioxolan-2-yl)phenyl]-4,4,5,5-tetramethyl-1,3,2-dioxaborolane (Intermediate A4.1)

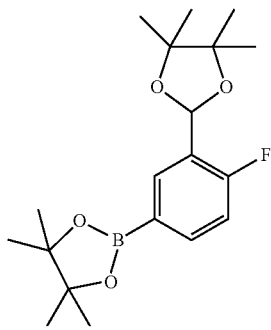 [SMILES: CC1(C)OB(c2ccc(F)c(C3OC(C)(C)C(C)(C)O3)c2)OC1(C)C]

A mixture of 4-fluoro-3-formylphenylboronic acid (1.5 g, 8.93 mmol) and pinacol (4.22 g, 35.73 mmol) were dissolved in 30 mL toluene. Then p-toluensulfonic acid monohydrate (0.085 g, 0.45 mmol) was added and the mixture was heated at 90° C. for 4 h. The mixture was allowed to cool to room temperature. The solid formed was filtered off and the mother liquors were concentrated in vacuum to leave an oily residue that crystallizes upon standing. This solid was suspended in 30 mL of $^i$PrOH and heated at 70° C. to help dissolution. After cooling, 12 mL of water were added dropwise, to crystallize the compound. After addition, the thick slurry was filtered on a Buchner funnel. The cake was washed with water and dried under reduced pressure. From the mother liquors, a second solid precipitated and it was recovered by filtration on a Buchner funnel and the cake was washed with water. Both solids were dried together under reduced pressure to give 2-[4-fluoro-3-(4,4,5,5-tetramethyl-1,3-dioxolan-2-yl)phenyl]-4,4,5,5-tetramethyl-1,3,2-dioxaborolane as an off-white solid (3.07 g, 8.76 mmol, 98% yield).

UPLC-MS: 1.44 min, 351.2 [M+H]+, method 3.

Step 2. 4-[4-Fluoro-3-(4,4,5,5-tetramethyl-1,3-dioxolan-2-yl)phenyl]-3-(1-hydroxyethyl)-1H-isochromen-1-one

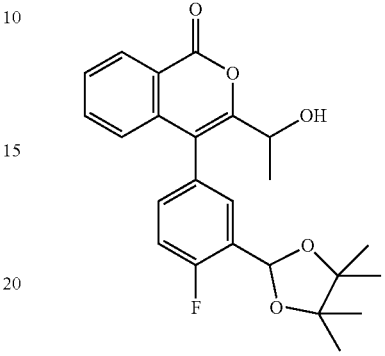

The title compound was made in a similar way as that of Intermediate A1 using 4-bromo-3-(1-hydroxyethyl)-1H-isochromen-1-one (Intermediate A2 in WO 2015091685) (2.83 g, 10.51 mmol), 2-[4-fluoro-3-(4,4,5,5-tetramethyl-1,3-dioxolan-2-yl)phenyl]-4,4,5,5-tetramethyl-1,3,2-dioxaborolane (Intermediate A4.1) (3.07 g, 8.76 mmol), K$_3$PO$_4$ (5.58 g, 26.28 mmol) and XPhos-Pd-G2 (0.345 g, 0.438 mmol). After work-up the residue was purified by flash chromatography on a 100 g silica gel Biotage SNAP column (eluent: gradient of AcOEt in cyclohexane from 0 to 35%). Evaporation of opportune fractions provided 4-[4-fluoro-3-(4,4,5,5-tetramethyl-1,3-dioxolan-2-yl)phenyl]-3-(1-hydroxyethyl)-1H-isochromen-1-one as light yellow solid (1.79 g, 4.34 mmol, 50% yield).

UPLC-MS: 1.23 min, 413.2 [M+H]+, method 3.

Intermediate A5: 4-(3-Fluoro-5-(4,4,5,5-tetramethyl-1,3-dioxolan-2-yl)phenyl)-3-(1-hydroxyethyl)-1H-isochromen-1-one

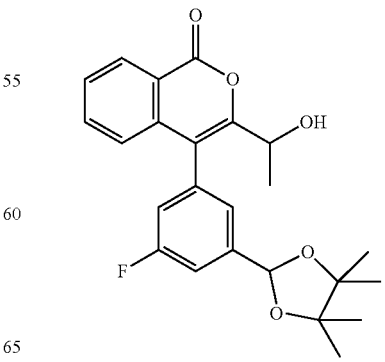

Step 1. 2-[3-Fluoro-5-(4,4,5,5-tetramethyl-1,3-dioxolan-2-yl)phenyl]-4,4,5,5-tetramethyl-1,3,2-dioxaborolane (Intermediate A5.1)

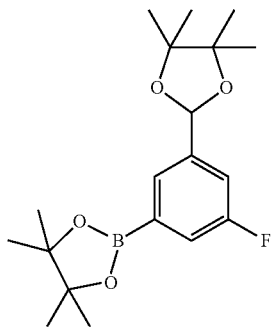 [SMILES: CC1(C)OB(c2cc(F)cc(C3OC(C)(C)C(C)(C)O3)c2)OC1(C)C]

A mixture of 3-fluoro-5-formylphenylboronic acid (1 g, 5.95 mmol) and pinacol 76-09-5 (2.8 g, 23.8 mmol) were dissolved in Toluene (20 mL). Then p-toluensulfonic acid monohydrate (0.057 g, 0.3 mmol) was added and the mixture was heated at 90° C. for 4 h. The mixture was allowed to cool to room temperature. It was concentrated under vacuum to give 2-[3-fluoro-5-(4,4,5,5-tetramethyl-1,3-dioxolan-2-yl)phenyl]-4,4,5,5-tetramethyl-1,3,2-dioxaborolane as light yellow oil (crude material). Used as such in the next step.

UPLC-MS: 1.48 min, 351.3 [M+H]+, method 3.

Step 2. 4-(3-Fluoro-5-(4,4,5,5-tetramethyl-1,3-dioxolan-2-yl)phenyl)-3-(1-hydroxyethyl)-1H-isochromen-1-one The title compound was made in a similar way as that of Intermediate A1 using 4-bromo-3-(1-hydroxyethyl)-1H-isochromen-1-one (Intermediate A2 in WO 2015091685) (1.9 g, 7.14 mmol), 2-[3-fluoro-5-(4,4,5,5-tetramethyl-1,3-dioxolan-2-yl)phenyl]-4,4,5,5-tetramethyl-1,3,2-dioxaborolane (Intermediate A5.1) (5.95 theoretical mmol), $K_3PO_4$ (3.8 g, 17.85 mmol) and XPhos-Pd-G2 (0.236 g, 0.3 mmol). After work-up the residue was purified by flash chromatography on 110 g Silica-NH SNAP cartridge (eluent from Cy to EtOAc 30%). It was purified again by 25 g Silica gel SNAP cartridge (eluent from Cy to EtOAc 30%) to afford 4-(3-fluoro-5-(4,4,5,5-tetramethyl-1,3-dioxolan-2-yl)phenyl)-3-(1-hydroxyethyl)-1H-isochromen-1-one as white foam (0.250 g, 0.61 mmol, 9%).

UPLC-MS: 1.22 min, 413.3 [M+H]+, method 3.

Intermediate A6: 4-(3-(1-(Dimethylamino)ethyl)phenyl)-3-(1-hydroxyethyl)-1H-isochromen-1-one

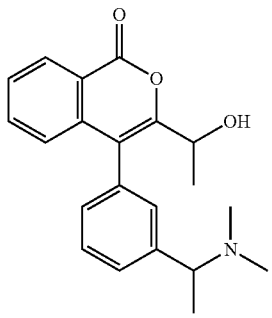

The title compound was made in a similar way as that of Intermediate A1 using 4-bromo-3-(1-hydroxyethyl)-1H-isochromen-1-one (Intermediate A2 in WO 2015091685) (1.62 g, 6.03 mmol), (3-(1-(dimethylamino)ethyl)phenyl)boronic acid (970 mg, 5.02 mmol), $K_3PO_4$ (3.47 g, 15.1 mmol) and XPhos-Pd-G2 (0.277 g, 0.35 mmol). After work-up the residue was purified by chromatography with $H_2O\backslash MeCN\backslash HCOOH$ 95:5:0.1% and $MeCN\backslash H_2O\backslash HCOOH$ 95:5:0.1% to afford 4-(3-(1-(dimethylamino)ethyl)phenyl)-3-(1-hydroxyethyl)-1H-isochromen-1-one (0.356 g, crude material).

UPLC-MS: 0.45 min, 338.2 [M+H]+, method 1.

Intermediate B1: 3-(1-Hydroxyethyl)-4-(3-((4-methylpiperazin-1-yl)methyl)phenyl)-1H-isochromen-1-one

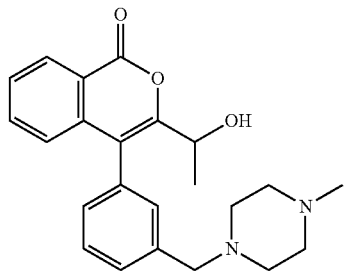 [SMILES: CC(O)c1oc(=O)c2ccccc2c1-c1cccc(CN2CCN(C)CC2)c1]

In a 250 mL round bottomed flask 3-(3-(1-hydroxyethyl)-1-oxo-1H-isochromen-4-yl)benzaldehyde (Intermediate A1) (0.500 g, 1.699 mmol) was dissolved in DCM (20 mL), 1-methylpiperazine (0.582 mL, 5.10 mmol) was added followed by acetic acid (0.292 mL, 5.10 mmol). Sodium triacetoxyhydroborate (1.800 g, 8.49 mmol) was then added portion wise. The mixture was poured into a mixture of DCM and saturated water solution of $NaHCO_3$ (100 mL/100 mL) and effervescence was observed. Organic phase was concentrated under vacuum and the resulting crude material was purified by RP chromatography (Biotage Isolera, 60 g C18 cartridge, gradient elution from 0 to 50% B in A in 10 CV; A: 95:5 water/acetonitrile+0.1% HCOOH, B: 5:95 water/acetonitrile+0.1% HCOOH; flow 30 ml/min) to give 3-(1-hydroxyethyl)-4-(3-((4-methylpiperazin-1-yl)methyl)phenyl)-1H-isochromen-1-one (0.482 g, 1.274 mmol, 75% yield).

UPLC-MS: 0.73 min, 379.1 [M+H]+, method 1.

Intermediates B2 found in the table below may be prepared starting from suitable reagents reported below following similar procedures as for compound B1.

| Intermediate & Name | Molecular Structure | Reagents | UPLC-MS or $^1$H-NMR |
|---|---|---|---|
| Intermediate B2<br>4-(3-((Dimethylamino)methyl)phenyl)-3-(1-hydroxyethyl)-1H-isochromen-1-one | | A1 and dimethylamine | Rt = 0.87 min, 324.0 [M + H]+, method 4. |

Intermediate C1: 3-(1-Bromoethyl)-4-(3-((4-methylpiperazin-1-yl)methyl)phenyl)-1H-isochromen-1-one

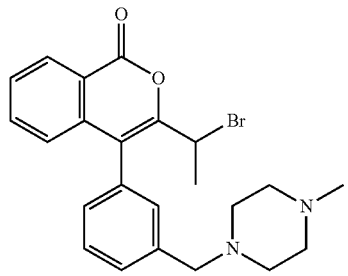 [SMILES: CC(Br)c1oc(=O)c2ccccc2c1-c1cccc(CN2CCN(C)CC2)c1]

3-(1-Hydroxyethyl)-4-(3-((4-methylpiperazin-1-yl)methyl)phenyl)-1H-isochromen-1-one (Intermediate B1) (0.482 g, 1.274 mmol) was dissolved in dry DCM (20 mL) then 1M tribromophosphine in DCM (2.55 mL, 2.55 mmol) was slowly added. The mixture was stirred at r.t. The reaction was quenched by addition of 60 mL of a saturated water solution of NaHCO$_3$ (gas evolution) and extracted with 60 mL of DCM, the organic phase was concentrated under vacuum to give 3-(1-bromoethyl)-4-(3-((4-methylpiperazin-1-yl)methyl)phenyl)-1H-isochromen-1-one as a red oil (crude material).

UPLC-MS: 1.07 min, 441.0 [M]+ and 442.9 [M+2]+, method 4.

Intermediates C2-C7 found in the table below may be prepared starting from suitable intermediate (Int.) reported below following similar procedures as for compound C1.

| Intermediate & Name | Molecular Structure | Int. | UPLC-MS or $^1$H-NMR |
|---|---|---|---|
| Intermediate C2<br>3-(1-Bromo ethyl)-4-(3-((dimethylamino)methyl)phenyl)-1H-isochromen-1-one | | B2 | Crude material<br>Rt = 1.27 min, 385.9 [M]+ and 387.9 [M + 2]+, method 4 |
| Intermediate C3<br>3-(1-Bromo ethyl)-4-[4-chloro-3-(4,4,5,5-tetramethyl-1,3-dioxolan-2-yl)phenyl]-1H-isochromen-1-one | | A2 | Rt = 1.43 min, 493.2 [M + H]+, method 3 |

| Intermediate & Name | Molecular Structure | Int. | UPLC-MS or $^1$H-NMR |
|---|---|---|---|
| Intermediate C4 tert-Butyl (2R)-2-{3-[3-(1-bromoethyl)-1-oxo-1H-isochromen-4-yl]phenyl}pyrrolidine-1-carboxylate | | A3 | Rt = 1.46 min, 499.2 [M + H]+, method 3 |
| Intermediate C5 3-(1-Bromoethyl)-4-[4-fluoro-3-(4,4,5,5-tetramethyl-1,3-dioxolan-2-yl)phenyl]-1H-isochromen-1-one | | A4 | Rt = 1.44 min, 476.0 [M + H]+, method 3 |
| Intermediate C6 3-(1-Bromoethyl)-4-(3-fluoro-5-(4,4,5,5-tetramethyl-1,3-dioxolan-2-yl)phenyl)-1H-isochromen-1-one | | A5 | Rt = 1.48 min, 476.2 [M + H]+, method 3 |
| Intermediate C7 3-(1-Bromoethyl)-4-(3-(1-(dimethylamino)ethyl)phenyl)-1H-isochromen-1-one | | A6 | Crude material Rt = 0.62 min, 400.0 [M]+ and 402.0 [M + 2]+, method 1 |

Intermediate D1: 3-(1-(4-Amino-3-(5-methoxypyridin-3-yl)-1H-pyrazolo[3,4-d]pyrimidin-1-yl)ethyl)-4-(3-((4-methylpiperazin-1-yl)methyl)phenyl)-1H-isochromen-1-one

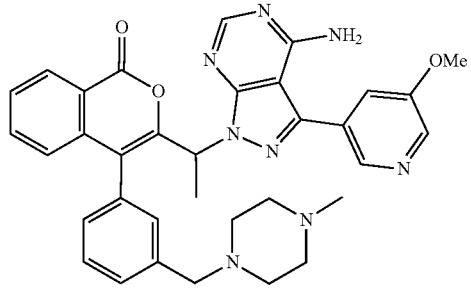 [SMILES: COc1cncc(-c2nn(C(C)c3oc(=O)c4ccccc4c3-c3cccc(CN4CCN(C)CC4)c3)c3ncnc(N)c23)c1]

In a 250 mL round bottomed flask, 3-(5-methoxypyridin-3-yl)-1H-pyrazolo[3,4-d]pyrimidin-4-amine (0.463 g, 1.912 mmol) and potassium carbonate (0.528 g, 3.82 mmol) were suspended in dry DMF (15 mL) and the mixture heated at 60° C. for 15 min prior addition of the 3-(1-bromoethyl)-4-(3-((4-methylpiperazin-1-yl)methyl)phenyl)-1H-isochromen-1-one (Intermediate C1) dissolved in 5 mL of dry DMF. After two hours, 0.200 g of 3-(5-methoxypyridin-3-yl)-1H-pyrazolo[3,4-d]pyrimidin-4-amine and an extra amount of $K_2CO_3$ were added and heating was continued at 40° C. for 3 h. The reaction was quenched with a saturated water solution of $NaHCO_3$ and extracted with 40 mL of DCM, then concentrated to leave a brown oil that was purified by RP chromatography (Biotage Isolera, 60 g C18 cartridge, gradient elution from 0 to 50% B in A in 10 CV; A: 95:5 water/acetonitrile+0.1% HCOOH, B: 5:95 water/acetonitrile+0.1% HCOOH) to leave 3-(1-(4-amino-3-(5-methoxypyridin-3-yl)-1H-pyrazolo[3,4-d]pyrimidin-1-yl)ethyl)-4-(3 methylpiperazin-1-yl)methyl)phenyl)-1H-isochromen-1-one as a yellow oil (0.342 g, 0.567 mmol, 45% yield).

UPLC-MS: 0.60 min, 603.2 [M+H]+, method 1.

Intermediates D2 found in the table below may be prepared starting from suitable intermediate (Int.) reported below following similar procedures as for compound D1.

Intermediate E1a: 3-(1-{4-Amino-3-iodo-1H-pyrazolo[3,4-d]pyrimidin-1-yl}ethyl)-4-[4-chloro-3-(4,4,5,5-tetramethyl-1,3-dioxolan-2-yl)phenyl]-1H-isochromen-1-one

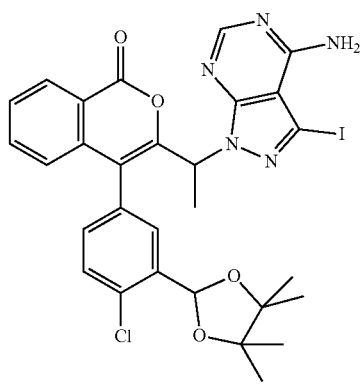 [SMILES: CC(c1oc(=O)c2ccccc2c1-c1ccc(Cl)c(C2OC(C)(C)C(C)(C)O2)c1)n1nc(I)c2c(N)ncnc21]

3-Iodo-1H-pyrazolo[3,4-d]pyrimidin-4-amine (0.311 g, 1.19 mmol) and $K_2CO_3$ (0.47 g, 3.4 mmol) were suspended in DMF (10 mL) and the mixture was stirred at 60° C. for 30 min. Then 3-(1-bromoethyl)-4-[4-chloro-3-(4,4,5,5-tetramethyl-1,3-dioxolan-2-yl)phenyl]-1H-isochromen-1-one (Intermediate C3) (0.557 g, 1.13 mmol) dissolved in DMF (5 mL) was slowly added and the mixture was maintained at 60° C. for 90 min. The reaction was cooled to r.t. and then AcOEt and water were added. The phases were separated and the aqueous layer was extracted with EtOAc. The combined organic layers were washed with water, dried over anhydrous $Na_2SO_4$ and the solvent was removed under reduced pressure. The residue was purified by flash chromatography on a 100 g Biotage SNAP KP-Sil cartridge, eluting with a gradient of AcOEt in cyclohexane from 50 to 100%, to give title compound 3-(1-{4-amino-3-iodo-1H-pyrazolo[3,4-d]pyrimidin-1-yl}ethyl)-4-[4-chloro-3-(4,4,5,5-tetramethyl-1,3-dioxolan-2-yl)phenyl]-1H-isochromen-1-one (0.379 g, 0.564 mmol, 50% yield).

UPLC-MS: 1.3 min, 671.2 [M+H]+, method 3.

Intermediates E2a-E5a found in the table below may be prepared starting from suitable intermediate (Int.) reported below following similar procedures as for compound E1a.

| Intermediate & Name | Molecular Structure | Int. | UPLC-MS or $^1$H-NMR |
|---|---|---|---|
| Intermediate D2<br>3-(1-(4-Amino-3-(5-methoxypyridin-3-yl)-1H-pyrazolo[3,4-d]pyrimidin-1-yl)ethyl)-4-(3-((dimethylamino)methyl)phenyl)-1H-isochromen-1-one | | C2 | Rt = 0.89 min, 548.0 [M + H]+, method 4. |

| Intermediate & Name | Molecular Structure | UPLC-MS or Int. | ¹H-NMR |
|---|---|---|---|
| Intermediate E2a<br>tert-Butyl (2R)-2-{3-[3-(1-{4-amino-3-iodo-1H-pyrazolo[3,4-d]pyrimidin-1-yl}ethyl)-1-oxo-1H-isochromen-4-yl]phenyl}pyrrolidine-1-carboxylate | | C4 | Rt = 1.26 min, 679.38 [M + H]+, method 3. |
| Intermediate E3a<br>3-(1-{4-Amino-3-iodo-1H-pyrazolo[3,4-d]pyrimidin-1-yl}ethyl)-4-[4-fluoro-3-(4,4,5,5-tetramethyl-1,3-dioxolan-2-yl)phenyl]-1H-isochromen-1-one | | C5 | Rt = 1.23 min, 656.2 [M + H]+, method 3. |
| Intermediate E4a<br>3-(1-(4-Amino-3-iodo-1H-pyrazolo[3,4-d]pyrimidin-1-yl)ethyl)-4-(3-fluoro-5-(4,4,5,5-tetramethyl-1,3-dioxolan-2-yl)phenyl)-1H-isochromen-1-one | | C6 | Rt = 1.26 min, 656.3 [M + H]+, method 3. |
| Intermediate E5a<br>3-(1-(4-Amino-3-iodo-1H-pyrazolo[3,4-d]pyrimidin-1-yl)ethyl)-4-(3-(1-(dimethylamino)ethyl)phenyl)-1H-isochromen-1-one | | C7 | Rt = 0.57 min, 581.0 [M + H]+, method 1. |

Intermediate E1b: 5-[3-(1-{4-Amino-3-iodo-1H-pyrazolo[3,4-d]pyrimidin-1-yl}ethyl)-1-oxo-1H-isochromen-4-yl]-2-chlorobenzaldehyde

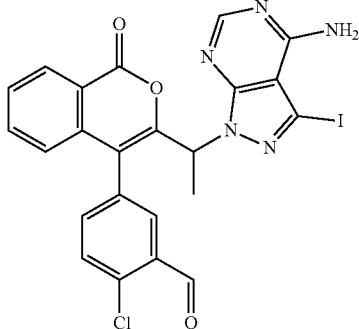 [SMILES: CC(c1oc(=O)c2ccccc2c1-c1ccc(Cl)c(C=O)c1)n1nc(I)c2c(N)ncnc21]

3-(1-{4-amino-3-iodo-1H-pyrazolo[3,4-d]pyrimidin-1-yl}ethyl)-4-[4-chloro-3-(4,4,5,5-tetramethyl-1,3-dioxolan-2-yl)phenyl]-1H-isochromen-1-one (0.379 g, 0.565 mmol) was dissolved in $CH_3CN$ (5 mL) and then 1N $HCl_{aqueous}$ (5 mL) was added. The resulting suspension was stirred at room temperature overnight. The solid in suspension was recovered by filtration on a Buchner funnel. The resulting cake was washed several times with diethyl ether till the pH resulted neutral and it was dried under high vacuum. Compound 5-[3-(1-{4-amino-3-iodo-1H-pyrazolo[3,4-d]pyrimidin-1-yl}ethyl)-1-oxo-1H-isochromen-4-yl]-2-chlorobenzaldehyde (0.32 g, 0.56 mmol, 99% yield) was obtained as a white solid and used in the next step without further purification.

UPLC-MS: 1.06 min, 572.1 [M+H]+, method 3.

Intermediates E3b-E4b found in the table below may be prepared starting from suitable intermediate (Int.) reported below following similar procedures as for compound E1b.

| Intermediate & Name | Molecular Structure | Int. | UPLC-MS or $^1$H-NMR |
|---|---|---|---|
| Intermediate E3b 5-[3-(1-{4-Amino-3-iodo-1H-pyrazolo[3,4-d]pyrimidin-1-yl}ethyl)-1-oxo-1H-isochromen-4-yl]-2-fluorobenzaldehyde | | E3a | Rt = 0.98 min, 556.08 [M + H]+, method 3 |
| Intermediate E4b 3-(3-(1-(4-Amino-3-iodo-1H-pyrazolo[3,4-d]pyrimidin-1-yl)ethyl)-1-oxo-1H-isochromen-4-yl)-5-fluorobenzaldehyde | | E4a | Rt = 1.01 min, 556.2 [M + H]+, method 3 |

Intermediate E1c: 3-(1-{4-Amino-3-iodo-1H-pyrazolo[3,4-d]pyrimidin-1-yl}ethyl)-4-{4-chloro-3-[(dimethylamino)methyl]phenyl}-1H-isochromen-1-one

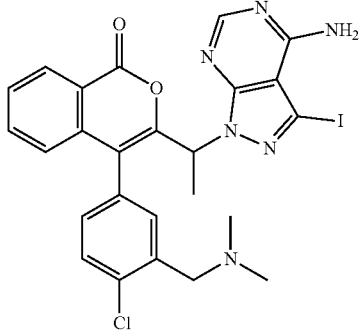 [SMILES: CC(c1oc(=O)c2ccccc2c1-c1ccc(Cl)c(CN(C)C)c1)n1nc(I)c2c(N)ncnc21]

To a stirred suspension of 5-[3-(1-{4-amino-3-iodo-1H-pyrazolo[3,4-d]pyrimidin-1-yl}ethyl)-1-oxo-1H-isochromen-4-yl]-2-chlorobenzaldehyde (Intermediate F1) (0.150 g, 0.26 mmol) in DCM/dioxane/CH$_3$CN (10 mL/2 mL/2 mL), 2M dimethylamine in THF (0.212 mL, 0.39 mmol) was added. This suspension was stirred at room temperature for 30 min. Then Na(OAc)$_3$BH (0.110 g, 0.52 mmol) was added and the mixture was stirred at r.t. overnight. Additional 1.5 eq 2M dimethylamine in THF (0.212 mL, 0.39 mmol) was added followed by 2 eq. of Na(OAc)$_3$BH (0.110 g, 0.52 mmol). The mixture was left to react at r.t. for 2 h. The mixture was quenched with a saturated water solution of NaHCO$_3$, the product extracted with DCM (3×) and washed with water (1×). The combined organic layers were passed through a phase separator and the solvent was removed under vacuum. The residue was purified by column chromatography on a 25 g Biotage silica gel column, using as eluent a gradient of MeOH in DCM from 0 to 10%. Desired compound 3-(1-{4-amino-3-iodo-1H-pyrazolo[3,4-d]pyrimidin-1-yl}ethyl)-4-{4-chloro-3-[(dimethylamino)methyl]phenyl}-1H-isochromen-1-one (0.105.2 g, 0.175 mmol, 67% yield) was obtained as a white solid.
UPLC-MS: 0.48-0.53 min, 568.3 [M+H]+, method 3.

Intermediates E3c-E4c found in the table below may be prepared starting from suitable reagents reported below following similar procedures as for compound E1c.

| Intermediate & Name | Molecular Structure | Reagents | UPLC-MS or $^1$H-NMR |
|---|---|---|---|
| Intermediate E3c 3-(1-{4-Amino-3-iodo-1H-pyrazolo[3,4-d]pyrimidin-1-yl}ethyl)-4-{4-fluoro-3-[(4-methylpiperazin-1-yl)methyl]phenyl}-1H-isochromen-1-one | | E3b and 1-methylpiperazine | Rt = 0.64-0.66 min, 640.1 [M + H]+, method 3 |
| Intermediate E4c 3-(1-(4-Amino-3-iodo-1H-pyrazolo[3,4-d]pyrimidin-1-yl)ethyl)-4-(3-fluoro-5-((4-methylpiperazin-1-yl)methyl)phenyl)-1H-isochromen-1-one | | E4b and 1-methylpiperazine | Rt = 0.65-0.66 min, 640.2 [M + H]+, method 3 |

Intermediate E7: 3-(1-{4-Amino-3-iodo-1H-pyrazolo[3,4-d]pyrimidin-1-yl}ethyl)-4-{3-[(2R)-pyrrolidin-2-yl]phenyl}-1H-isochromen-1-one hydrochloride

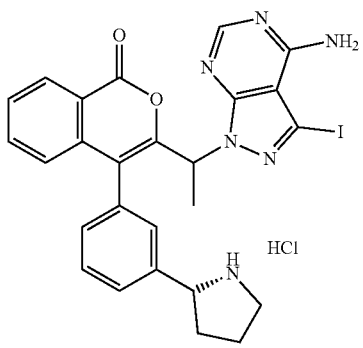

tert-Butyl (2R)-2-{3-[3-(1-{4-amino-3-iodo-1H-pyrazolo[3,4-d]pyrimidin-1-yl}ethyl)-1-oxo-1H-isochromen-4-yl]phenyl}pyrrolidine-1-carboxylate (Intermediate E2a) (0.224 g, 0.330 mmol) was dissolved in 1.25M HCl in MeOH (5 mL) and the mixture was shaken at 38° C. for 4 h. The solvent was removed at reduced pressure to provide 3-(1-{4-amino-3-iodo-1H-pyrazolo[3,4-d]pyrimidin-1-yl}ethyl)-4-13-[(2R)-pyrrolidin-2-yl]phenyl-1H-isochromen-1-one hydrochloride as a white solid (0.212 g, crude). The material was used in the next step without further purification.

UPLC-MS: 1.03 min, 579.2 [M+H]+, method 5.

Intermediate E8: 3-(1-{4-Amino-3-iodo-1H-pyrazolo[3,4-d]pyrimidin-1-yl}ethyl)-4-{3-[(2R)-1-methylpyrrolidin-2-yl]phenyl}-1H-isochromen-1-one

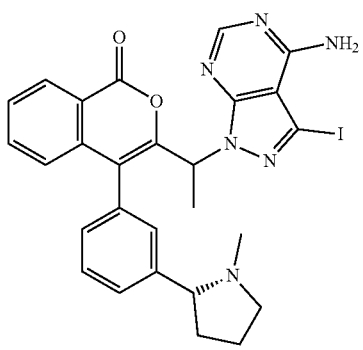

To a stirred suspension of 3-(1-{4-amino-3-iodo-1H-pyrazolo[3,4-d]pyrimidin-1-yl}ethyl)-4-{3-[(2R)-pyrrolidin-2-yl]phenyl}-1H-isochromen-1-one hydrochloride (Intermediate E6) (0.212 g, crude) in DCM (4 mL), formaldehyde 37% Wt. aqueous solution (61 µL, 0.825 mmol) was added, followed by DIPEA (63 µL, 0.363 mmol) and acetic acid (1 drop). The mixture was stirred at room temperature for 30 minutes. Then Na(OAc)$_3$BH (0.084 g, 0.396 mmol) was added and the mixture was stirred at r.t. overnight. The mixture was quenched with saturated water solution of NaHCO$_3$ and extracted with DCM. The organic phases were filtered through a hydrophobic phase separator and the solvent was removed at reduced pressure. The crude was purified by flash chromatography (Biotage SP1, 25 g KP-Sil-column, DCM/MeOH from 100:0 to 90:10 as eluent). The evaporation of opportune fractions provided 3-(1-{4-amino-3-iodo-1H-pyrazolo[3,4-d]pyrimidin-1-yl}ethyl)-4-{3-[(2R)-1-methylpyrrolidin-2-yl]phenyl}-1H-isochromen-1-one as an off-white solid (0.142 g, 0.24 mmol, 73% yield).

UPLC-MS: 1.16 min, 593.3 [M+H]+, method 5.

PREPARATION OF COMPOUNDS

Comparative Example 1: 3-(1-(4-amino-3-(3-fluoro-5-hydroxyphenyl)-1H-pyrazolo[3,4-d]pyrimidin-1-yl)ethyl)-4-(3-((4-methylpiperazin-1-yl)methyl)phenyl)-1H-isochromen-1-one, Second Eluting Enantiomer

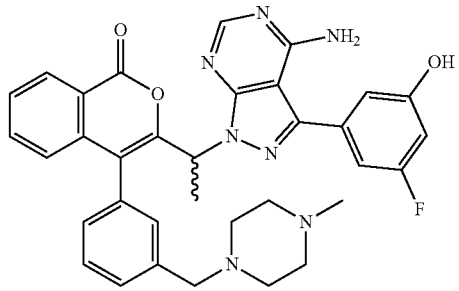 [SMILES: CC(c1oc(=O)c2ccccc2c1-c1cccc(CN2CCN(C)CC2)c1)n1nc(-c2cc(O)cc(F)c2)c2c(N)ncnc21]

Racemate 3-(1-(4-amino-3-(3-fluoro-5-hydroxyphenyl)-1H-pyrazolo[3,4-d]pyrimidin-1-yl)ethyl)-4-(3-((4-methylpiperazin-1-yl)methyl)phenyl)-1H-isochromen-1-one (Example 142 in WO 2015091685) (0.110 g, 0.16 mmol) was dissolved in MeOH/DCM 1/1 (10 mL) and submitted to chiral resolution by Chiral preparative chromatography. Conditions: Column: Chiralpak IC (25×2.0 cm), 5 µm; Mobil phase: n-Hexane/(Ethanol/Dichloromethane 9/1+ 0.1% isopropyl amine) 82/18% v/v; Flow rate 18 mL/min; DAD detection: 220 nm; Loop: 500 µl; Injection: 6.5 mg/injection. The fractions containing the second eluted enantiomer were evaporated to dryness to afford title 3-(1-(4-amino-3-(3-fluoro-5-hydroxyphenyl)-1H-pyrazolo[3,4-d]pyrimidin-1-yl)ethyl)-4-(3-((4-methylpiperazin-1-yl)methyl)phenyl)-1H-isochromen-1-one (0.031 g, 0.056 mmol).

Chiral HPLC (Method A1),

Rt 13.8 min (second eluting enantiomer), e.e.>99%.

UPLC-MS: 0.63-0.66, 606.4 [M+H]+, method 3.

$^{1}$H NMR (400 MHz, DMSO-d6) δ ppm 10.15-10.24 (m, 1H), 8.19-8.28 (m, 1H), 8.07 (s, 1H), 7.73-7.80 (m, 1H), 7.58-7.67 (m, 1H), 7.25-7.50 (m, 3H), 6.85-7.00 (m, 3H), 6.78-6.84 (m, 1H), 6.63-6.70 (m, 1H), 5.66-5.81 (m, 1H), 3.23-3.60 (m, 2H), 1.99-2.48 (m, 11H), 1.74-1.89 (m, 3H).

Analytical Data of First Eluting Enantiomer

Chiral HPLC (Method A1),

Rt 12.0 min (first eluted enantiomer), e.e.>99%,

UPLC and $^{1}$H NMR analyses of pure enantiomers were superimposable in all respect.

Example 1: 3-{1-[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one hydrochloride

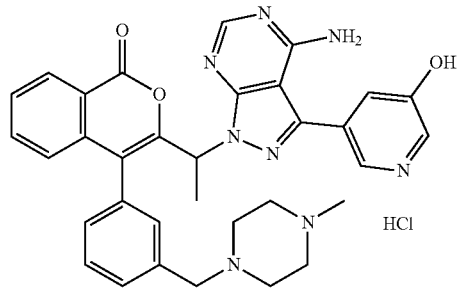 [SMILES: CC(c1oc(=O)c2ccccc2c1-c1cccc(CN2CCN(C)CC2)c1)n1nc(-c2cncc(O)c2)c2c(N)ncnc21 ; Cl]

In a 500 mL round bottomed flask equipped with a magnetic stirrer 3-(1-(4-amino-3-(5-methoxypyridin-3-yl)-1H-pyrazolo[3,4-d]pyrimidin-1-yl)ethyl)-4-(3-((4-methylpiperazin-1-yl)methyl)phenyl)-1H-isochromen-1-one (Intermediate D1) (0.342 g, 0.567 mmol) was suspended in DCM (10 mL) then 1M BBr$_3$ in DCM (5 mL, 5.00 mmol) was added. The mixture was left stirring 24 h, then MeOH (20 mL) and a little amount of 2M HCl was added. The solution was then concentrated under vacuum and purified by RP chromatography (Biotage Isolera, 60 g C18 cartridge, gradient elution from 0 to 50% B in A in 10 CV; A: 95:5 water/acetonitrile+0.1% HCOOH, B: 5:95 water/acetonitrile+0.1% HCOOH, flow 20 ml/min) to give the desired product 3-{1-[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one hydrochloride (0.093 g, 0.149 mmol, 26% yield).

UPLC-MS: 0.52 min, 589.0 [M+H]+, method 1.

$^{1}$H NMR (400 MHz, DMSO-d6) δ ppm 11.39 (br. s., 1H), 9.87-10.49 (m, 1H), 8.05-8.32 (m, 5H), 7.72-7.81 (m, 1H), 7.59-7.67 (m, 1H), 6.67-7.53 (m, 8H), 5.66-5.84 (m, 1H), 3.34-3.63 (m, 2H), 2.24-2.92 (s, 11H), 1.75-1.92 (m, 3H).

Example 3: 3-{1-[4-Amino-3-(5-hydroxypyridin-3-yl)-1H-pyrazolo[3,4-d]pyrimidin-1-yl]ethyl}-4-{4-chloro-3-[(dimethylamino)methyl]phenyl}-1H-isochromen-1-one

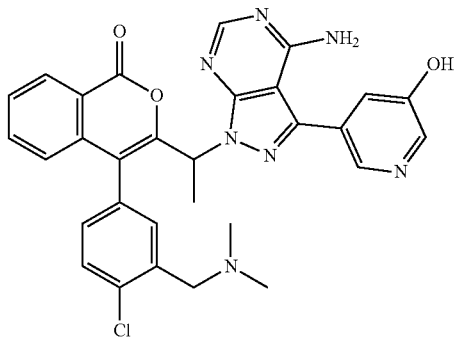 [SMILES: CC(c1oc(=O)c2ccccc2c1-c1ccc(Cl)c(CN(C)C)c1)n1nc(-c2cncc(O)c2)c2c(N)ncnc21]

A mixture of 3-(1-{4-amino-3-iodo-1H-pyrazolo[3,4-d]pyrimidin-1-yl}ethyl)-4-{4-chloro-3-[(dimethylamino)methyl]phenyl}-1H-isochromen-1-one (Intermediate E1c) (0.105 g, 0.175 mmol), 5-(4,4,5,5-tetramethyl-[1,3,2]dioxaborolan-2-yl)pyridin-3-ol (0.077 g, 0.35 mmol) and K$_3$PO$_4$ (0.113 g, 0.53 mmol) in THF/water 3:1 (volume: 8 mL) was deoxygenated by N$_2$ bubbling for 5 min, then SPhos-Pd-G2 (0.025 g, 0.035 mmol) was added and the mixture was heated at 85° C. for 3 h. The mixture was cooled to room temperature and portioned between water and DCM. The aqueous phase was extracted with DCM (3×), the combined organic layers were washed with water (1×), passed through a phase separator and the solvent was removed under reduced pressure. The obtained crude was purified by flash chromatography on a 11 g Biotage silica-NH column using as eluent a gradient of MeOH in DCM from 0 to 25%. The desired product 3-{1-[4-amino-3-(5-hydroxypyridin-3-yl)-1H-pyrazolo[3,4-d]pyrimidin-1-yl]ethyl}-4-{4-chloro-3-[(dimethylamino)methyl]phenyl}-1H-isochromen-1-one was obtained as a yellowish solid (0.068 g, 0.12 mmol, 68% yield).

UPLC-MS: 0.61 min, 601.2 [M+H]+, method 3.

$^{1}$H NMR (400 MHz, DMSO-d$_6$) δ ppm 8.18-8.25 (m, 3H), 8.05-8.10 (m, 1H), 7.73-7.79 (m, 1H), 7.58-7.66 (m, 1H), 7.30-7.58 (m, 3H), 6.85-7.03 (m, 2H), 5.71-5.79 (m, 1H), 3.13-3.22 (m, 2H), 2.01-2.25 (m, 6H), 1.80-1.87 (m, 3H).

Example 2 found in the table below was prepared starting from suitable intermediate (Int.) reported below following similar procedures as for compound 1. Examples 4-7 found in the table below were prepared starting from suitable intermediate (Int.) reported below following similar procedures as for compound 3.

| Ex. | Name | Molecular Structure | Int. | UPLC-MS or ¹H-NMR |
|---|---|---|---|---|
| 2 | 3-(1-(4-Amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one hydrochloride | | D2 | Rt = 0.75 min, 534.0 [M + H]+, method 4. ¹H NMR (400 MHz, DMSO-d6) δ ppm 12.14 (br. s., 1H), 10.18 (br. s., 1H), 8.05-8.31 (m, 4H), 7.73-7.81 (m, 1H), 7.59-7.67 (m, 1H), 7.45-7.57 (m, 1H), 7.28-7.42 (m, 3H), 6.84-7.02 (m, 2H), 5.63-5.86 (m, 1H), 3.36-3.71 (m, 2H), 2.04-2.40 (m, 6H), 1.77-1.87 (m, 3H). |
| 4 | 3-{1-[4-Amino-3-(5-hydroxypyridin-3-yl)-1H-pyrazolo[3,4-d]pyrimidin-1-yl]ethyl}-4-{3-[(2R)-1-methylpyrrolidin-2-yl]phenyl}-1H-isochromen-1-one | | E7 | Rt = 0.69 min, 560.4 [M + H]+, method 5 ¹H NMR (400 MHz, MeOD) δ ppm 8.31-8.38 (m, 1H), 8.24-8.29 (m, 1H), 8.17-8.23 (m, 1H), 8.04-8.14 (m, 1H), 7.67-7.76 (m, 1H), 7.58-7.66 (m, 1H), 7.18-7.56 (m, 4H), 6.74-7.08 (m, 2H), 5.86-6.04 (m, 1H), 2.82-3.32 (m, 2H), 1.56-2.48 (m, 11H). |
| 5 | 3-{1-[4-Amino-3-(5-hydroxypyridin-3-yl)-1H-pyrazolo[3,4-d]pyrimidin-1-yl]ethyl}-4-{4-fluoro-3-[(4-methylpiperazin-1-yl)methyl]phenyl}-1H-isochromen-1-one | | E3 | Rt =: 0.61-0.63 min, 607.1 [M + H]+, method 5 ¹H NMR (400 MHz, DMSO) δ ppm 10.34 (br. s., 1H), 8.23 (s, 3H), 8.09 (s, 1H), 7.73-7.80 (m, 1H), 7.59-7.67 (m, 1H), 7.11-7.42 (m, 3H), 6.97-7.06 (m, 1H), 6.86-6.93 (m, 1H), 5.70-5.80 (m, 1H), 3.22-3.59 (m, 2H), 1.96-2.47 (m, 11H), 1.78-1.88 (m, 3H). |
| 6 | 3-(1-(4-Amino-3-(5-hydroxypyridin-3-yl)-1H-pyrazolo[3,4-d]pyrimidin-1-yl)ethyl)-4-(3-fluoro-5-((4-methylpiperazin-1-yl)methyl)phenyl)-1H-isochromen-1-one | | E4c | Rt =: 0.52-0.59 min, 607.3 [M + H]+, method 3 ¹H NMR (400 MHz, DMSO) δ ppm 10.22 (br. s., 1H), 8.17-8.28 (m, 3H), 8.04-8.11 (m, 1H), 7.72-7.82 (m, 1H), 7.58-7.68 (m, 1H), 7.31-7.39 (m, 1H), 7.06-7.20 (m, 2H), 6.88-6.93 (m, 1H), 6.64-6.75 (m, 1H), 5.74-5.86 (m, 1H), 3.31 (s, 2H), 2.01-2.47 (m, 11H), 1.76-1.88 (m, 3H). |

-continued

| Ex. | Name | Molecular Structure | Int. | UPLC-MS or $^1$H-NMR |
|---|---|---|---|---|
| 7 | 3-(1-(4-Amino-3-(5-hydroxypyridin-3-yl)-1H-pyrazolo[3,4-d]pyrimidin-1-yl)ethyl)-4-(3-(1-(dimethylamino)ethyl)phenyl)-1H-isochromen-1-one | | E5c | Rt = 0.50 min, 548.1 [M + H]+, method 1. $^1$H NMR (400 MHz, DMSO) δ ppm 10.16 (br. s., 1H), 8.18-8.33 (m, 3H), 8.03-8.16 (m, 2H), 7.74-7.82 (m, 1H), 7.58-7.67 (m, 1H), 7.27-7.54 (m, 4H), 6.85-7.09 (m, 3H), 5.66-5.82 (m, 1H), 3.11-3.27 (m, 1H), 1.93-2.21 (m, 6H), 1.77-1.88 (m, 3H), 1.08-1.20 (m, 3H). |

Example 1a: 3-{1-[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one, First Eluted Enantiomer

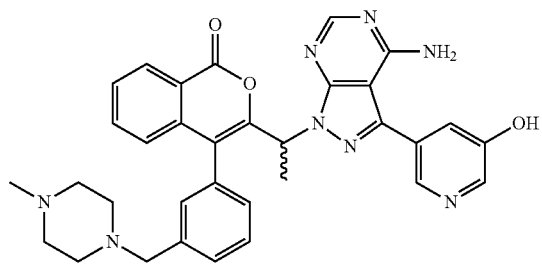 [SMILES: CC(c1oc(=O)c2ccccc2c1-c1cccc(CN2CCN(C)CC2)c1)n1nc(-c2cncc(O)c2)c2c(N)ncnc21]

Racemate 3-{1-[4-amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one hydrochloride (Example 1) (0.122 g, 0.195 mmol) was diluted with MeOH and was passed through a PL-HCO3 MP resin cartridge (5 g) to obtain the free base (0.080 g), which was dissolved in MeOH (5 mL) and submitted to chiral resolution by Chiral preparative chromatography. Conditions: Column: Whelk 01 (R,R) (25×2.1 cm), 10 μm; Mobil phase: n-Hexane/(2-Propanol/Methanol 1/1+0.1% isopropylamine) 30/70% v/v; Flow rate 17 mL/min; DAD detection: 220 nm; Loop: 300 μl; Injection: 4.8 mg/injection. The fractions containing the first eluted enantiomer were evaporated to dryness to afford title compound 3-{1-[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one (0.021 g, 0.036 mmol).

Chiral HPLC (Method A2),

Rt 8.7 min (first eluted enantiomer), e.e.>99%

UPLC-MS: 0.48-0.54, 589.4 [M+H]+, method 3.

$^1$H NMR (400 MHz, DMSO-d6) δ ppm 9.84-10.55 (m, 1H), 8.02-8.36 (m, 4H), 7.72-7.81 (m, 1H), 7.57-7.67 (m, 1H), 7.25-7.52 (m, 4H), 6.87-7.01 (m, 2H), 6.53-7.88 (m, 2H), 5.64-5.83 (m, 1H), 3.13-3.62 (m, 2H), 2.00-2.47 (m, 11H), 1.76-1.88 (m, 3H).

Analytical Data of Second Eluting Enantiomer

Chiral HPLC (Method A2),

Rt 10.0 min (second eluted enantiomer), e.e.=97.4%

UPLC and $^1$H NMR analyses of pure enantiomers were superimposable in all respect.

Single Crystal X-Ray Diffraction analysis (D. de Sanctis, A. Beteva, H. Caserotto, F. Dobias, J. Gabadinho, T. Giraud, A. Gobbo, M. Guijarro, M. Lentini, B. Lavault, T. Mairs, S. McSweeney, S. Petitdemange, V. Rey-Bakaikoa, J. Surr, P. Theveneau, G. A. Leonard, C. Mueller-Dieckmann, *J. Sync. Rad.* 2012, 19, 455-461) was performed on the crystallography beamline ID29 of European Synchrotron Radiation Facility (ESRF) following the method and conditions herewith specified: Single crystal was obtained with vapor diffusion experiments in EtOH/H2O 6% (internal solvent) and EtOAc (outside solvent). Diffraction data were recorded with a fast readout Pilatus 6M-F pixel detector (Dectris LTD). Data collection was performed at 100 K using an Oxford cryosystem applying rotating-crystal method, with monochromatic radiation at wavelength of 1.000 Å. The structure was solved by dual space algorithm implemented in the program ShelxT, and was refined with the program SHELXL-2016/6. The Flack parameter (S. Parsons, H. D. Flack, T. Wagner, Acta Cryst. 2013, B69, 249-259) was obtained from data collected at 1 Å as Flack x=0.07(18); and the absolute configuration was assigned as S to the first eluted enantiomer of example 1a. The determination was used to confirm absolute configuration of the structure as here reported:

(S)-3-{1-[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one, first eluted enantiomer (the title compound of example 1a).

(R)-3-{1-[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one, second eluted enantiomer.

Example 2a: 3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one, First Eluted Enantiomer

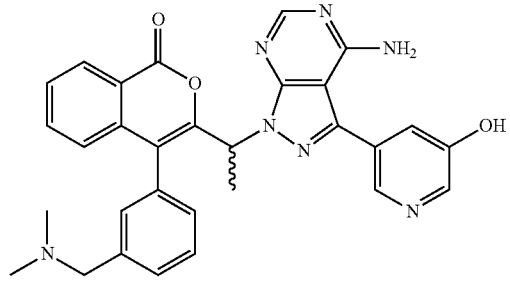 [SMILES: CC(c1oc(=O)c2ccccc2c1-c1cccc(CN(C)C)c1)n1nc(-c2cncc(O)c2)c2c(N)ncnc21]

Racemate 3-{1-[4-amino-3-(5-hydroxypyridin-3-yl)-1H-pyrazolo[3,4-d]pyrimidin-1-yl]ethyl}-4-{3-[(dimethylamino)methyl]phenyl}-1H-isochromen-1-one hydrochloride (Example 2) (0.228 g, 0.400 mmol) was diluted with MeOH and was passed through a PL-HCO3 MP resin cartridge (5 g) to obtain the free base (0.110 g), which was dissolved in Ethanol/Methanol/n-Hexane 1/1/1 (10 mL) and submitted to chiral resolution by Chiral preparative chromatography. Conditions: Column: Chiralpak AD-H (25×2.0 cm), 5 μm; Mobil phase: n-Hexane/(Ethanol+0.1% isopropylamine) 75/25% v/v; Flow rate 20 mL/min; DAD detection: 220 nm; Loop: 2500 μl; Injection: 27 mg/injection. The fractions containing the first eluted enantiomer were evaporated to dryness to afford title compound 3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one (0.040 g, 0.075 mmol).

Chiral HPLC (Method A3),
Rt 6.4 min (first eluted enantiomer), e.e.>99%.
UPLC-MS: 0.46-0.50, 534.3 [M+H]+, method 3.
$^1$H NMR (400 MHz, DMSO-d6) δ ppm 10.16 (bs, 1H), 8.18-8.30 (m, 3H), 8.04-8.12 (m, 1H), 7.72-7.81 (m, 1H), 7.57-7.68 (m, 1H), 7.43-7.53 (m, 1H), 7.25-7.40 (m, 4H), 6.82-7.04 (m, 3H), 5.67-5.83 (m, 1H), 3.16-3.49 (m, 2H), 1.97-2.25 (m, 6H), 1.78-1.87 (m, 3H).

Analytical Data of Second Eluting Enantiomer
Chiral HPLC (Method A3),
Rt 14.6 min (second eluted enantiomer), e.e.>99%
UPLC and $^1$H NMR analyses of pure enantiomers were superimposable in all respect.

Example 4a: 3-(1-(4-amino-3-(5-hydroxypyridin-3-yl)-1H-pyrazolo[3,4-d]pyrimidin-1-yl)ethyl)-4-(3-((R)-1-methylpyrrolidin-2-yl)phenyl)-1H-isochromen-1-one, First Eluted Diastereomer

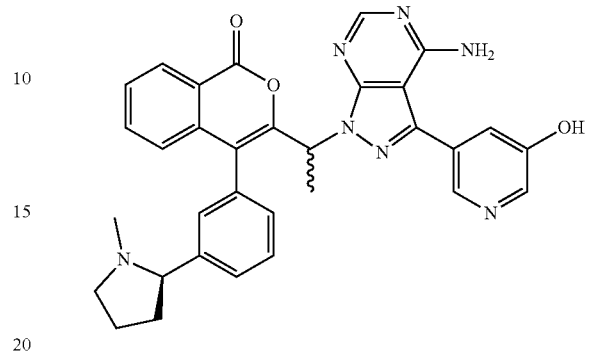

3-{1-[4-Amino-3-(5-hydroxypyridin-3-yl)-1H-pyrazolo[3,4-d]pyrimidin-1-yl]ethyl}-4-{3-[(2R)-1-methylpyrrolidin-2-yl]phenyl}-1H-isochromen-1-one (Example 4) (0.050 g, 0.089 mmol) was dissolved in 1,1,1,3,3,3-Hexafluoro-2-propanol (2.5 mL) and submitted to chiral resolution by Chiral preparative chromatography. Conditions: Column: Chiralpak AD-H (25×2.0 cm), 5 μm; Mobile phase: (Ethanol+0.1% isopropylamine) 15%; Flow rate 46 mL/min; DAD detection: 220 nm; Loop: 600 μl; Injection: 12 mg/injection. The fractions containing the first eluted diastereomer were evaporated to dryness to afford title compound 3-(1-(4-amino-3-(5-hydroxypyridin-3-yl)-1H-pyrazolo[3,4-d]pyrimidin-1-yl)ethyl)-4-(3-((R)-1-methylpyrrolidin-2-yl)phenyl)-1H-isochromen-1-one (0.017 g, 0.03 mmol).
Chiral HPLC (Method A4),
Rt 3.3 min (first eluted diastereomer), d.e.=98.5%,
UPLC-MS: 0.70 min, 560.5 [M+H]+, method 5.
$^1$H NMR (400 MHz, MeOD) δ ppm 8.29-8.35 (m, 1H), 8.22-8.28 (m, 1H), 8.15-8.21 (m, 1H), 8.03-8.12 (m, 1H), 7.65-7.74 (m, 1H), 7.56-7.63 (m, 1H), 7.18-7.55 (m, 4H), 6.76-6.99 (m, 2H), 5.88-6.00 (m, 1H), 2.85-3.28 (m, 2H), 1.54-2.46 (m, 11H).

Analytical Data of Second Eluting Diastereomer
Chiral HPLC (Method A4),
Rt 7.0 min (second eluted diastereomer), d.e.=96.2%.
UPLC-MS: 0.70 min, 560.5 [M+H]+, method 5.
$^1$H NMR (400 MHz, MeOD) δ ppm 8.30-8.35 (m, 1H), 8.24-8.29 (m, 1H), 8.17-8.21 (m, 1H), 8.04-8.13 (m, 1H), 7.66-7.75 (m, 1H), 7.56-7.64 (m, 1H), 7.17-7.55 (m, 4H), 6.74-7.06 (m, 2H), 5.83-6.03 (m, 1H), 2.94-3.29 (m, 2H), 1.70-2.45 (m, 11H).

Salt Screening Examples

Particularly preferred salts of the invention are prepared following known methods of salification described for example in Handbook of Pharmaceutical Salts: Properties, Selection, and Use, 2011 (P. Heinrich Stahl, Camille G. Wermuth (Eds.)°

The Salts reported in the table here below were prepared from the (S) enantiomer compound of example 1a and the salts from the (R) enantiomer are equally obtained using the said generally known methods of salification.

As an example the maleate salt was obtained dissolving 300 mg of free base in acetone (9 mL) and stirring at ~20° C. for ~2 hrs and then at 50° C. for ~30 min to gain complete free base dissolution. Maleic acid (1.02 eq) was then added at 20° C. Slurry was left stirring at 650 rpm~20° C. o/n. Sample was filtered on syringe filter (porosity 20 μL, PTFE frit) and dried under vacuum at room temperature until reaching constant weight (3 hrs) (yield=86%).

| Acid Name | Equivalent of acid | Salt name | salts form example 1a |
|---|---|---|---|
| HBr | 1 | Hydrobromide | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hydrobromide |
| HCl | 1 | Hydrochloride | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hydrochloride |
| Naphtalene-1,5-disulfonic acid | 0.5 | Hemi 1,5-Naphthalene disulfonate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemi 1,5-Naphthalenedisulfonate |
| Sulfuric acid | 0.5 | Hemisulfate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemisulfate |
| P-toluensulfonic acid | 1 | Tosylate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Tosylate |
| Methansulfonic acid | 1 | Mesylate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Mesylate |
| Naphtalen-2-sulfonic acid | 1 | 2-Naphthalene sulfonate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one-2-Naphthalene sulfonate |
| Isethionic acid | 1 | Isethionate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Isethionate |
| Maleic acid | 1 | Maleate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Maleate |
| Ethansulfonic acid | 1 | Esylate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Esylate |
| Pamoic acid | 0.5 | Hemipamoate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemipamoate |
| 1-hydroxy naphthalene-2-carboxylic acid | 1 | Xinafoate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Xinafoate |
| Salycilic acid | 1 | Salycilate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Salycilate |
| Benzoic acid | 1 | Benzoate | (R) and/or (S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Benzoate |

Some further preferred salts are reported in the table here below prepared from the (S) enantiomer compound of example 2a and the salts from the (R) enantiomer are equally obtained using the said generally known methods of salification.

| Acid Name | Equivalent of acid | Salt name | salts form example 2a |
|---|---|---|---|
| HBr | 1 | Hydrobromide | (R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Hydrobromide |
| HCl | 1 | Hydrochloride | (R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Hydrochloride |
| Methansulfonic acid | 1 | Mesylate | (R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Mesylate |
| Isethionic acid | 1 | Isethionate | (R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one 2-Naphthalene sulfonate |
| Maleic acid | 1 | Maleate | (R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Maleate |
| Ethansulfonic acid | 1 | Esylate | (R) and/or (S)-3-(1-(4-amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one Esylate |

The salts listed above are obtained in solid form, most of them in substantially amorphous solid state; some particularly preferred were exhibiting a crystalline solid state.

Pharmacological Activity of the Compounds of the Invention.

In Vitro Determination of the PI3K Enzyme Inhibitory Activity in the Cell Free Assay Human recombinant proteins PI3Kα, PI3Kβ, PI3Kγ and PI3Kδ were purchased from Millipore Ltd (Billerica, MA). Compounds were dissolved at 0.5 mM in DMSO and were tested at different concentrations for their activity against PI3Ks using the ADP-Glo™ Kinase Assay (Promega, Madison WI) according to the manufacturer's instructions.

Briefly, the kinase reactions were performed in 384-well white plates (Greiner Bio-One GmbH, Frickenhausen). Each well was loaded with 0.1 μl of test compounds and 2.5 μl of 2× reaction buffer (40 mM Tris pH7.5, 0.5 mM EGTA, 0.5 mM $Na_3VO_4$, 5 mM β-glycerophosphate, 0.1 mg/ml BSA, 1 mM DTT), containing 50 μM PI and PS substrates (L-α-phosphatidylinositol sodium salt and L-α-phosphatidyl-L-serine, Sigma-Aldrich, St. Louis MO) and the PI3K recombinant proteins (PI3Kγ 0.25 ng/μl, PI3Kδ 1 ng/μl, PI3Kα 0.125 ng/μl, PI3Kβ 1 ng/μl).

The reactions were started by adding 2.5 μl of 2×ATP solution to each well (final concentrations: PI3Kγ ATP 30 μM; PI3Kδ ATP 80 μM; PI3Kα ATP 50 μM; PI3Kβ ATP 100 μM) and incubated for 60 min at room temperature. Subsequently, each kinase reaction was incubated for 40 min with 5 μl ADP-Glo™ Reagent, allowing depletion of unconsumed ATP. Then, the Kinase Detection Reagent (10 μl) was added in each well to convert ADP to ATP and to allow the newly synthesized ATP to be measured using a luciferase/luciferin reaction. Following 60 min incubation, the luminescence signal was measured using a Wallac EnVision® multilabel reader (PerkinElmer, Waltham MA).

Curve fitting and IC50 calculation were carried out using a four-parameter logistic model in XLfit (IDBS, Guilford, UK) for Microsoft Excel (Microsoft, Redmont, WA).

The results are provided below

Table 1a: Results of the in vitro determination of the PI3K enzyme inhibitory activity in the cell free assay for comparative examples; reproduced from WO2015091685.

| Compound of Example N. | PI3K alpha inhibition | PI3K beta inhibition | PI3K delta inhibition | PI3K gamma inhibition |
|---|---|---|---|---|
| 142 Comparative example 1 | + | + | +++ | + |
| 168a Comparative example 2 | ++ | ++ | +++ | ++ |
| 67a Comparative example 3 | ++ | ++ | +++ | ++ | wherein the compounds were classified in term of potency with respect to their inhibitory activity on PI3K -alfa, -beta, -gamma and -delta according to the following:
+++ : IC50 < 10 Nm
++ : IC50 in the range 10-1000 nM
+: IC50 > 1000 nM Compounds of the present invention are potent delta inhibitors having Delta IC50<2 nM in the enzymatic assay as reported in the following table 1b.

In Vitro Determination of the PI3Kδ Enzyme Inhibitory Activity in the THP-1 Assay The inhibitory activity of compounds on PI3Kinase in living cells was determined by evaluating the inhibition of the PI3Kδ-AKT pathway endogenously expressed on THP-1 cells. THP-1 cell suspension from T75 flask (0.4-1.0×10$^6$/mL) was centrifuged and the cell pellet re-suspended in starvation medium at 1.5×10$^6$ cells/mL. Cell plate was prepared by dispensing 3×10$^5$ cells/well and incubated for 24 hours at 37° C. before the assay. Test compounds were serially diluted 1:3 in DMSO and then further diluted 1:100 in compound medium. Starved THP-1 cells were pre-incubated at 37° C. for 60 minutes with test compound solutions or vehicle. Cells were then stimulated for 10 minutes by Macrophage Colony-Stimulating Factor (M-CSF) 2.5 ng/mL or stimulus medium (control of basal pAKT levels). Cells were then lysed and the amount of phosphorylated AKT measured by using a Cisbio p-Ser473 AKT HTRF assay kit. Stimulation was ended by the addition of supplemented lysis buffer. Cell plate was shaken for 30 minutes at room temperature to complete cell lysis, followed by the addition of HTRF conjugates and incubated for further 4 hours at room temperature. Conjugates react with pAKT causing an increase in HTRF signal that is measured with the Envision plate reader with a HRTF reading protocol. Ratio data were fitted using a logistical four-parameter equation to determine IC$_{50}$. IPI-145 compound was used as pharmacological standard.

The compounds of the invention showed cellular IC50 (THP-1 IC$_{50}$ nM) values lower than 4 nM with respect to the PI3K-delta subunit as reported in the following table 1b.

| Comments | Structure | Enzymatic | | THP-1 | |
|---|---|---|---|---|---|
| | | Delta Ki nM | Delta IC$_{50}$ nM | IC$_{50}$ nM Cellular | Delta cell drop-off** |
| Comparative example 1 Second eluting enantiomer by chiral separation from compound mixture of ex 142 in WO 2015/091685 | 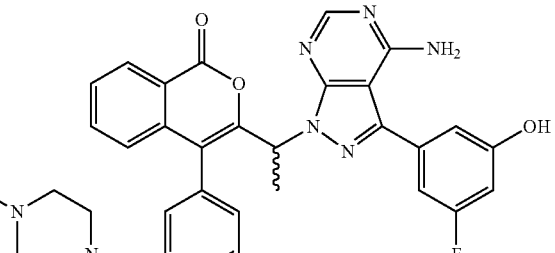 | 1.1 | 2.2 | 1.8 | 1.6 |
| Comparative example 2 ex 168a in WO 2015/091685 | 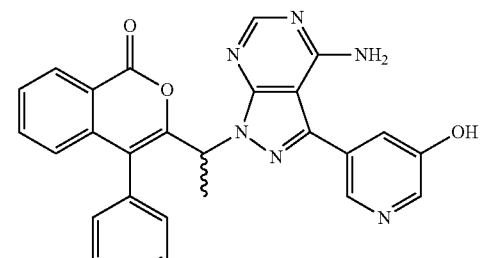 | 0.6 | 1.1 | 1.6 | 2.7 |
| Comparative example 3 ex 67a in WO 2015/091685 | 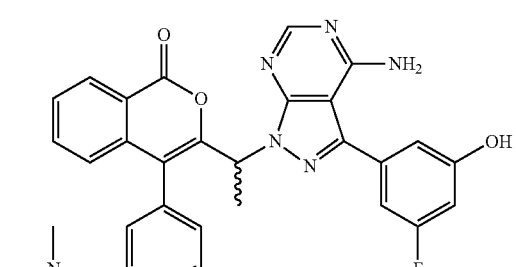 | 0.3 | 0.7 | 1.5 | 5.0 |
| Example 1a | 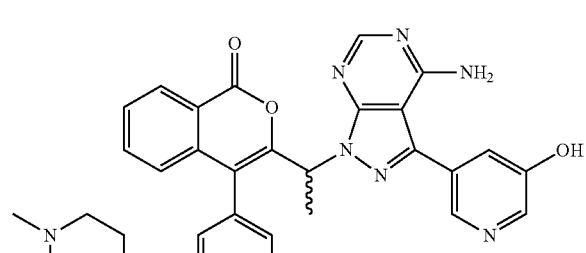 | 0.9 | 1.7 | 2.8 | 3.1 |

-continued
| Comments | | Enzymatic | | THP-1 | |
|---|---|---|---|---|---|
| | | Delta Ki nM | Delta IC$_{50}$ nM | IC$_{50}$ nM Cellular | Delta cell drop-off** |
| Example 2a | 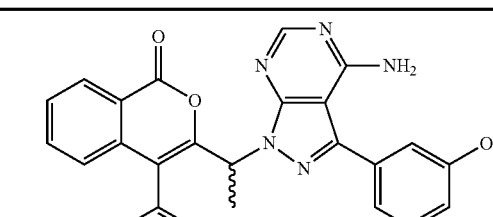 | 0.5 | 1.0 | 0.6 | 1.2 |
**Cellular/enzymatic activity = THP-1 IC$_{50}$ nM/Delta Ki nM
| Comments | | enzymatic | | THP-1 | |
|---|---|---|---|---|---|
| | | Delta Ki nM | Delta IC50 nM | IC50 nM cellular | Delta cell drop-off |
| Example 3 | 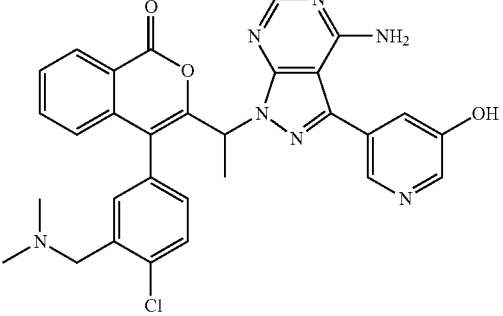 | 0.4 | 0.7 | 3.9 | 9.7 |
| Example 4a | 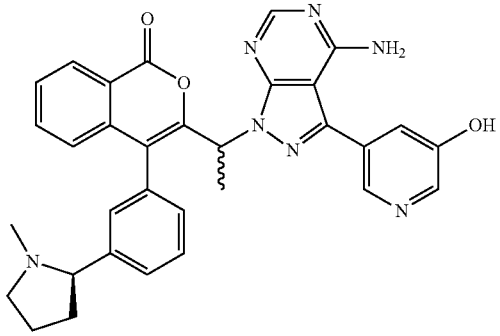 [SMILES: CC(c1oc(=O)c2ccccc2c1-c1cccc([C@H]2CCCN2C)c1)n1nc(-c2cncc(O)c2)c2c(N)ncnc21] | 0.1 | 0.3 | 1.0 | 10 |
| Example 5 | 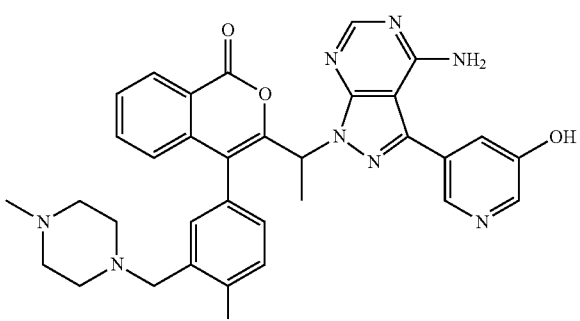 | 0.5 | 1.0 | 1.8 | 3.6 |

-continued

| Comments | enzymatic | | THP-1 | |
| --- | --- | --- | --- | --- |
| | Delta Ki nM | Delta IC50 nM | IC50 nM cellular | Delta cell drop-off |
| Example 6 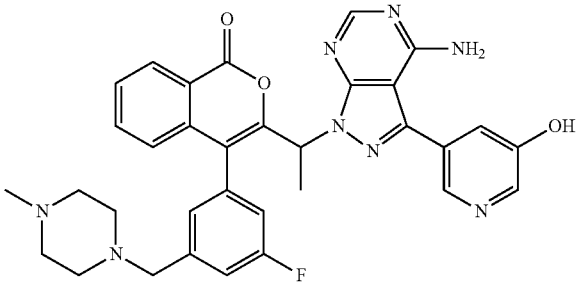 [SMILES: CC(c1oc(=O)c2ccccc2c1-c1cc(F)cc(CN2CCN(C)CC2)c1)n1nc(-c2cncc(O)c2)c2c(N)ncnc21] | 0.4 | 0.8 | 3.0 | 7.5 |
| Example 7 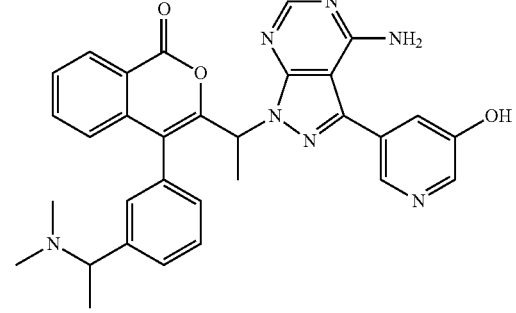 | 0.8 | 1.6 | 3.9 | 4.9 |

** Cellular/enzymatic activity = THP-1 $IC_{50}$ nM/Delta Ki nM

Protocol of Rat Model of Ovalbumin (OVA) Induced Lung Eosinophilia in Rat (WET Administration—Saline Solution)

Animals

Male Brown Norway rats (6 weeks old at arrival) were purchased from Charles River Laboratories Italy (Calco, Lecco). Prior to use, animals were acclimated for at least 5 days to the local vivarium conditions (room temperature: 20-24° C.; relative humidity: 40-70%), having free access to standard rat chow and tap water. All animal protocols described herein were carried out approved by the intramural animal-welfare committee for animal experimentation of Chiesi Farmaceutici and Ministry of Health and comply with the European Directive 2010/63 UE and Italian D Lgs 26/2014 (authorization number 198-PR).

Sensitization and Allergen Exposure

Male Brown-Norway rats were sensitized by intraperitoneal injection of a suspension containing OVA (1 mg/rat) and $Al(OH)_3$ (100 mg/rat) in 1 mL of saline for 3 consecutive days; two weeks later, the airway inflammation was induced by aerosol administration of the allergen. Specifically, the animals were exposed to an aerosol of OVA solution (1% in saline) that induced a massive influx of inflammatory cells in the airways, mainly represented by eosinophils and neutrophils. Briefly, rats were restrained in plexiglass tubes, introduced in the inhalation chamber and exposed to the aerosolised solution by nose-only inhalation for 30 min. The inhalation chamber was connected to a Medel Pro nebulizer that generated a nebulised solution in the chamber at a flow rate of approximately 3.3 l/min. Control animals were exposed to aerosolized saline.

Treatment with Test Compounds

For the assessment of anti-inflammatory duration of action (DoA) test compounds were administered intratracheally (i.t.) at different doses in the range 0.03 μmol/kg-1 μmol/kg at 2 or 12 hours before OVA challenge. The ED80 for each tested compound was determined from the above dose-response study. ED80 being the dose at which 80% of inhibition was achieved.

For the intratracheal administration of test compounds or vehicle, animals were anaesthetized with isoflurane or sevoflurane (4% in oxygen) and a laryngoscope was moved forward into the mouth to visualize the trachea and guide the insertion of a PE100 cannula directly into the trachea and located 1-2 mm above the bifurcation. The compounds were resuspended in saline (distilled water+0.5% NaCl) with 0.2% Tween 80 and instilled locally into the trachea in a volume of 0.5 ml/kg.

Bronchoalveolar Lavage and Cell Counting

At 24 hours after exposure either to OVA or saline aerosol, animals were anaesthetised with isoflurane or sevoflurane as previously described and sacrificed by bleeding from the abdominal aorta. Bronchoalveolar lavage fluid (BALF) was obtained by gently washing the lungs with 3 aliquots (4 ml each) of solution A [Hank's balanced salt solution (HBSS)× 10, 100 ml; ethylenediaminetetraacetic acid (EDTA) 100 mM, 100 mL; 4-(2-hydroxy-ethyl)-1-piperazineethansulphonic acid (HEPES) 1 mM, 10 mL; distilled water, 790 mL]. Routine recovery of BALF did not significantly differ between animals with ~80% of instilled volume recovered (9.5-10.5 mL).

The resulting BALF was centrifuged at 800×g for 10 min at 4° C. The pellets were resuspended in a volume of 1.5 mL and total and differential cell counts were performed within 2 hours using an automated cell counter (Dasit, Sysmex). The cell count per animal was calculated from the number of cells for 1 μl of BALF multiplied for the volume used for the re-suspension of the cell pellet.

Data Analysis

Compounds of the present invention administered 12 hours before OVA challenge at the dose of 0.1 μmol/kg corresponding to ED80, show a durable efficacy in inhibiting eosinophil recruitment in BALF, superior of 45%. The percentage of inhibition is calculated using the formula below:

% inhibition=100×((compound-treated OVA-challenged individual value−vehicle-treated OVA-challenged mean value)−(vehicle-treated OVA-challenged mean value−vehicle-treated saline-challenged mean value))/(vehicle-treated OVA-challenged mean value−vehicle-treated saline-challenged mean value).

Mean value is calculated from 8-10 rats for each group of treatment.

Correspondent compounds in WO2015091685 when compared to the compounds of the present invention were indeed found non-durable or less durable.

TABLE 1c

Results of the OVA-test.

| Comments | Structure | Administration time before OVA challenge | % of imhibition |
|---|---|---|---|
| Comparative Example 1 Second eluted enantiomer by chiral separation of racemic compound of ex 142 in WO 2015/091685 | [structure] | 12 h | 0% (Not durable) |
| Comparative Example 2 Single enantiomer ex 168a in WO 2015/091685 | [structure] | | Compound not even tested in OVA model for Insufficient lung retention**** |
| Comparative Example 3 Single enantiomer ex 67a in WO 2015/091685 | [structure] | 2 h | 34% ns*** |
| Example 1a | [structure] | 12 h | 55% |

TABLE 1c-continued

Results of the OVA-test.

| Comments | | Administration time before OVA challenge | % of inhibition |
|---|---|---|---|
| Example 2a | [chemical structure: isochromen-1-one linked to pyrazolo[3,4-d]pyrimidin-4-amine with 3-hydroxypyridinyl and 3-(dimethylaminomethyl)phenyl substituents] | 12 h | 57% |

\*\*\*ns = non-significant
\*\*\*\*J Aerosol Med Pulm Drug Deliv. 2018 Feb; 31(1):61-70. doi: 10.1089/jamp.2017.1369. Epub 2017 Aug 2.

Protocol of Rat Model of Ovalbumin (OVA) Induced Lung Eosinophilia in Rat (Administration as DRY Powder)

Materials and Methods

Animals

Male Brown Norway rats (6 weeks old at the arrival) were purchased from Charles River Laboratories Italy (Calco, Lecco). Prior to use animals were acclimated for at least 5 days to the local vivarium conditions (room temperature: 20-24° C.; relative humidity: 40-70%), having free access to standard rat chow and tap water. All animal protocols described herein were carried out approved by the intramural animal-welfare committee for animal experimentation of Chiesi Farmaceutici and Ministry of Health and comply with the European Directive 2010/63 UE and Italian D.Lgs 26/2014.

Sensitization and Allergen Exposure

Male Brown-Norway rats were sensitized by intraperitoneal injection of a suspension containing OVA (1 mg/rat) and $Al(OH)_3$ (100 mg/rat) in 1 mL of saline for 3 consecutive days. Two weeks later, the airway inflammation was induced by inhaled antigen. The animals were exposed to an aerosol of OVA solution (1% in saline) that induced a massive influx of inflammatory cells. mainly eosinophils and neutrophils into the airways. Briefly, rats were restrained in plexiglass tubes and exposed to the content of the inhalation chamber by nose-only inhalation for 30 min. The inhalation chamber was connected to a Medel Pro nebulizer that generated aerosolized ovalbumin that circulated through the chamber at the flow rate of approximately 3.3 l/min. The vehicle-control treated animals were exposed to aerosolized saline.

Treatment with Test Compounds

For the assessment of inhibitory potency and duration of action (DoA) test compounds were administered by the intratracheal route 12 hours before OVA challenge.

For the intratracheal administration of test compounds or vehicle, animals were anaesthetized with sevoflurane (4% in oxygen) and a laryngoscope was moved forward into the mouth to visualize the trachea and guide the insertion of a PennCentury device for dry powder directly into the trachea and located 1-2 mm above the bifurcation. Test compounds administered as dry powder were micronized and blended with 0.2% w/w Magnesium Stearate/Respitose SV003 at 0.233%, 0.755%, 7.75% strength (corresponding to dosage of 0.03-0.1-1.0 µmol/kg) with an injection weight of 10 mg/kg. Control animals received 10 mg/kg of the vehicle blend (0.2% w/w Magnesium Stearate/Respitose SV003). The ED80 for each tested compound is determined from the above dose-response study.

The compounds dry powder were blown into the airways during the spontaneous phase inspiration in an air volume of 4 mL.

Bronchoalveolar Lavage and Cell Counting

At 24 after exposure either to OVA or saline aerosol, animals were anaesthetised with isoflurane or sevoflurane as previously described and sacrificed by bleeding from the abdominal aorta. Bronchoalveolar lavage fluid (BALF) was obtained by gently washing the lungs with 3 aliquots (4 ml each) of solution A [Hank's balanced salt solution (HBSS)× 10, 100 ml; ethylenediaminetetraacetic acid (EDTA) 100 mM, 100 mL; 4-(2-hydroxy-ethyl)-1-piperazineethansulphonic acid (HEPES) 1 mM, 10 mL; distilled water, 790 mL]. Routine recovery of BALF did not significantly differ between animals with 80% of instilled volume recovered (9.5-10.5 mL).

The resulting BALF was centrifuged at 800×g for 10 min at 4° C. The pellets deriving from the same animal were combined and resuspended in a volume of 1.5 mL and total and differential cell counts were performed within 2 hours using an automated cell counter (Dasit, Sysmex). The cell count per animal was calculated from the number of cells for 1 µl of BALF multiplied for the volume used for the re-suspension of the cell pellet.

Data Analysis

All data are presented as mean±s.e.mean. For statistical analysis was performed on raw data using one-way analysis of variance (ANOVA) followed by Dunnett's post-hoc test for comparison with the OVA-sensitised, OVA-challenged group. The drug-induced individual values of inhibition of the cell recruitment were calculated comparing the drug-treated with the vehicle-treated OVA challenged control animals according to the following formula:

% inhibition={100%×((compound-treated OVA challenged individual value−vehicle-treated OVA-challenged control mean value)−(vehicle-treated OVA-challenged control mean value−vehicle-treated saline-challenged control mean value))/ (vehicle-treated OVA-challenged control mean value−vehicle-treated saline-challenged control mean value)}].

Mean value was calculated from 8-10 rats for each group of treatment.

The $ED_{50}$ values and 95% confidence limits were calculated by log-linear regression analysis based on the individual inhibition data. Statistical analysis was performed using GraphPad software, version 7.0, p<0.05 was considered a level of statistical significance.

Results

The anti-inflammatory duration of action of the maleate salt of the compound of example 1a was tested administered i.t. by PennCentury 2 and 12 hours before OVA challenge. The 1 μmol/kg dose showed a significant inhibition (% inhibition total cell recruitment: 84.1±5.5, p<0.01; % inhibition eosinophil recruitment: 79.3±8.4, p<0.01).

Overall, the data confirm that a compound according to the invention is efficacious as anti-inflammatory drug able to inhibit pulmonary accumulation of inflammatory cells and endowed with a prolonged duration of action.

The compounds of the invention at the dose of 1 μmol/kg demonstrate a significant and durable efficacy in inhibiting eosinophil recruitment in lung airways of rats when administered, as DPI formulation (dry powder protocol), 12 hours before OVA exposure exhibiting inhibition % equal to or more than 50% and even preferably equal to or more than 70%.

The compounds of the present invention are thus potent PI3K inhibitors, active in the enzymatic in vitro assay in the subnanomolar range (delta $K_i$<1 nM) and exhibit high activity also in THP-1 cellular model of PI3K delta inhibition (THP-1 $IC_{50}$<4 nM preferably ≤3 nM). Notably the activity is maintained in the cellular assay, with drop-off in activity from enzymatic to cellular assay lower than or equal to 10 fold; preferably equal to or lower than 3.5 fold THP-1 $IC_{50}$≤10×Delta $K_i$; preferably THP-1 $IC_{50}$≤3.5× Delta $K_i$;

Moreover, in an experiment of anti-inflammatory DoA, the compounds, according to the invention, administered as suspension 12 hours before OVA challenge at the dose of 0.1 μmol/kg, (ED80 for the tested compounds of the invention) demonstrate persistent anti-inflammatory efficacy superior of 45%. Following the same experimental protocol, the compounds, according to the invention, administered as a DPI formulation 12 hours before OVA challenge at the dose of 1 μmol/kg (ED80) still maintain significant and durable anti-inflammatory effect in inhibiting cell recruitment in lung airways; exhibiting persistent anti-inflammatory efficacy with inhibition % equal to or more than 50% and even preferably equal to or more than 70% in the dry powder protocol.

The invention claimed is:

1. A compound of formula (I):

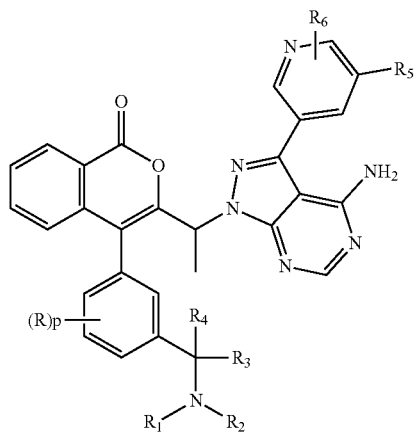

wherein:
each R, when present, is independently selected from the group consisting of: $OR_7$, halogen, and ($C_1$-$C_6$) alkyl;

$R_1$ and $R_2$ taken together with the nitrogen atom they are linked to, form a 4-methylpiperazine-1-yl group;

$R_3$ and $R_4$ are H;

$R_5$ is $OR_7$;

$R_6$ is selected from the group consisting of: H, $OR_7$, ($C_1$-$C_6$) alkyl, ($C_1$-$C_6$) haloalkyl, and ($C_1$-$C_6$) hydroxyalkyl;

$R_7$ is selected from the group consisting of: H and ($C_1$-$C_6$) alkyl; and p is zero or an integer ranging from 1 to 4;

or a pharmaceutically acceptable salt of said compound.

2. The compound or salt thereof according to claim 1 wherein the absolute configuration at carbon (*) is(S) or (R) with reference to the stereogenic center represented in formula (Ia) by the carbon atom labelled with an asterisk (*):

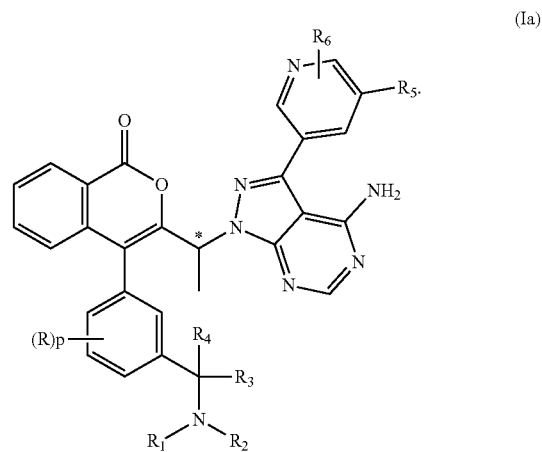

3. The compound or salt thereof according to claim 1 wherein:

p is zero;

$R_5$ is OH; and $R_6$ is H.

4. A compound selected from the group consisting of:
3-{1-[4-Amino-3-(5-hydroxypyridin-3-yl)-1H-pyrazolo[3,4-d]pyrimidin-1-yl]ethyl}-4-{3-[(4-methylpiperazin-1-yl)methyl]phenyl}-1H-isochromen-1-one;

3-(1-(4-Amino-3-(5-hydroxypyridin-3-yl)-1H-pyrazolo[3,4-d]pyrimidin-1-yl)ethyl)-4-(3-((dimethylamino)methyl)phenyl)-1H-isochromen-1-one;

3-{1-[4-Amino-3-(5-hydroxypyridin-3-yl)-1H-pyrazolo[3,4-d]pyrimidin-1-yl]ethyl}-4-{4-chloro-3-[(dimethylamino)methyl]phenyl}-1H-isochromen-1-one;

3-{1-[4-Amino-3-(5-hydroxypyridin-3-yl)-1H-pyrazolo[3,4-d]pyrimidin-1-yl]ethyl}-4-{3-[(2R)-1-methylpyrrolidin-2-yl]phenyl}-1H-isochromen-1-one;

3-{1-[4-Amino-3-(5-hydroxypyridin-3-yl)-1H-pyrazolo[3,4-d]pyrimidin-1-yl]ethyl}-4-{4-fluoro-3-[(4-methylpiperazin-1-yl)methyl]phenyl}-1H-isochromen-1-one;

3-(1-(4-Amino-3-(5-hydroxypyridin-3-yl)-1H-pyrazolo[3,4-d]pyrimidin-1-yl)ethyl)-4-(3-fluoro-5-((4-methylpiperazin-1-yl)methyl)phenyl)-1H-isochromen-1-one; and 3-(1-(4-Amino-3-(5-hydroxypyridin-3-yl)-1H-pyrazolo[3,4-d]pyrimidin-1-yl)ethyl)-4-(3-(1-(dimethylamino)ethyl)phenyl)-1H-isochromen-1-one, or a pharmaceutically acceptable salt of said compound.

5. A compound selected from the group consisting of:
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hydrobromide;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hydrochloride;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemi 1,5-Naphthalenedisulfonate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemisulfate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Tosylate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Mesylate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one 2-Naphthalene sulfonate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Isethionate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Maleate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Esylate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Hemipamoate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Xinafoate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Salycilate;
- (R) and/or(S)-3-(1-(4-amino-3-(5-hydroxypyridin-3-yl)-1H-pyrazolo[3,4-d]pyrimidin-1-yl)ethyl)-4-(3-((4-methylpiperazin-1-yl)methyl)phenyl)-1H-isochromen-1-one Benzoate, or a pharmaceutically acceptable salt of said compound.

6. A pharmaceutical composition comprising the compound or salt thereof as defined in claim 1, in admixture with one or more pharmaceutically acceptable carriers or excipients.

7. A pharmaceutical composition comprising the compound or salt thereof as defined in claim 1, in combination with one or more active ingredients.

8. The pharmaceutical composition according to claim 6, in the form of a dry powder, wherein a carrier is present comprising coarse particles of one or more pharmaceutically acceptable excipients, and further optionally an additive is present with lubricant or anti-adherent properties.

9. The pharmaceutical composition according to claim 8, wherein the coarse particles have a mass diameter between 30 and 500 micron.

10. A dry powder inhaler device filled with the pharmaceutical composition as defined in claim 8.

11. A kit comprising the pharmaceutical composition as defined in claim 8 and a dry powder inhaler device.

12. The pharmaceutical composition according to claim 6, in the form of a propellant-free pharmaceutical formulation wherein the said compound or salt thereof is dissolved or suspended in an aqueous vehicle, optionally comprising one or more further pharmaceutically acceptable excipients.

13. A kit comprising the pharmaceutical composition as defined in claim 12 and a nebulizer.

14. A method of treating at least one respiratory disorder associated with PI3K enzyme mechanisms selected from the group consisting of idiopathic chronic cough, cough-variant asthma, cough associated with thoracic tumour or lung cancer, viral or post-viral cough, upper airways cough syndrome (UACS), post nasal drip cough, cough associated gastro-oesophageal reflux disease, asthma, chronic bronchitis, chronic obstructive pulmonary disease (COPD) and interstitial lung disease, the method comprising administering the compound or salt thereof according to claim 1 to a subject in need thereof.

15. The method according to claim 14 wherein the disorder associated with PI3K enzyme mechanisms is asthma or COPD.

16. The method according to claim 14 wherein the disorder associated with PI3K enzyme mechanisms is idiopathic pulmonary fibrosis (IPF), cough and chronic cough.

* * * * *